United States Patent
Wang

(10) Patent No.: US 9,997,071 B2
(45) Date of Patent: *Jun. 12, 2018

(54) METHOD AND SYSTEM FOR AVOIDANCE OF PARKING VIOLATIONS

(71) Applicant: OPERR TECHNOLOGIES, INC., Flushing, NY (US)

(72) Inventor: Kevin Sunlin Wang, Flushing, NY (US)

(73) Assignee: OPERR Technologies, Inc., Flushing, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/382,240

(22) Filed: Dec. 16, 2016

(65) Prior Publication Data

US 2017/0098376 A1    Apr. 6, 2017

Related U.S. Application Data

(63) Continuation-in-part of application No. 14/832,584, filed on Aug. 21, 2015, now Pat. No. 9,558,665.

(60) Provisional application No. 62/086,560, filed on Dec. 2, 2014, provisional application No. 62/092,100, filed on Dec. 15, 2014, provisional application No. (Continued)

(51) Int. Cl.
| | |
|---|---|
| B60Q 1/48 | (2006.01) |
| G08G 1/14 | (2006.01) |
| G08G 1/01 | (2006.01) |
| G08G 1/017 | (2006.01) |
| G08G 1/052 | (2006.01) |

(52) U.S. Cl.
CPC ............ *G08G 1/148* (2013.01); *G08G 1/017* (2013.01); *G08G 1/0129* (2013.01); *G08G 1/052* (2013.01)

(58) Field of Classification Search
USPC .......................................................... 701/117
See application file for complete search history.

(56) References Cited

U.S. PATENT DOCUMENTS

| 8,063,797 | B1 * | 11/2011 | Sonnabend et al. ........ 340/932.2 |
| 8,229,658 | B1 * | 7/2012  | Dabell ........................ 701/117 |
| 8,432,297 | B2   | 4/2013  | Sonnabend et al. |

(Continued)

FOREIGN PATENT DOCUMENTS

| DE | 102010020135 | 11/2011 |
| WO | WO 2004/092876 | 10/2004 |

*Primary Examiner* — Brent Swarthout
(74) *Attorney, Agent, or Firm* — Monte, Wang & Associates, PLLC

(57) ABSTRACT

A system for providing parking guidance includes storing historical parking violation related data correlated to real-time, parking violation related data, where a central computing system communicates with a user's computing device for notifying a user how to avoid receiving parking violation citations. The data is stored in a unified database, where the data is clustered by data types and by type of vehicle or type of vehicle plate. The user's computing device is used to identify parking intent, and a location determining apparatus identifies a current location of the user. A user engagement panel is used to share parking violation related data, where rewards are allocated to a user for contributing useful data, which are rated. Highly rated data is incorporated into notifications. The data is analyzed to predict a violation. A notification corresponding to the current location and user type are generated when violations are predicted.

64 Claims, 20 Drawing Sheets

Related U.S. Application Data

62/113,922, filed on Feb. 9, 2015, provisional application No. 62/150,118, filed on Apr. 20, 2015.

(56) References Cited

U.S. PATENT DOCUMENTS

| | | | |
|---|---|---|---|
| 8,612,136 B2 | 12/2013 | Levine et al. | |
| 8,698,649 B2 | 4/2014 | Denaro | |
| 9,171,461 B1 | 10/2015 | Dabell | |
| 9,202,376 B1 * | 12/2015 | Evans | G08G 1/149 340/932.2 |
| 9,558,665 B2 * | 1/2017 | Wang | 340/932.2 |
| 2007/0216521 A1 | 9/2007 | Guensler et al. | |
| 2013/0138481 A1 * | 5/2013 | Handley | G06Q 10/00 705/7.37 |
| 2014/0266800 A1 * | 9/2014 | Koukoumidis | G08G 1/141 340/932.2 |
| 2016/0012726 A1 * | 1/2016 | Wang | G08G 1/0112 340/932.2 |
| 2017/0309170 A1 * | 10/2017 | Wang | G08G 1/0112 |

* cited by examiner

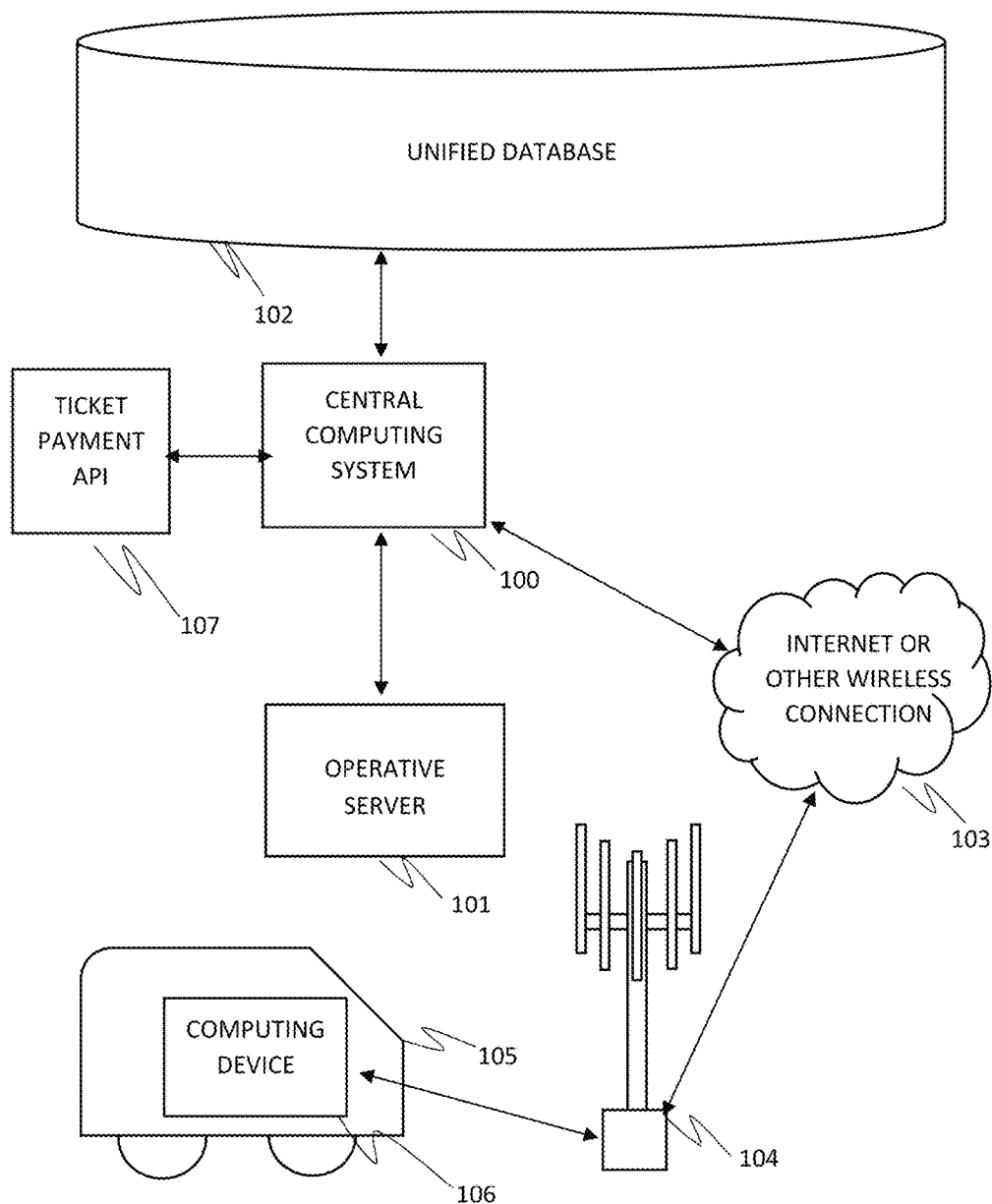

METHOD AND SYSTEM FOR AVOIDANCE OF PARKING VIOLATIONS

CROSS-REFERENCE TO RELATED APPLICATION

The present application is a continuation-in-part of application Ser. No. 14/832,584, filed on Aug. 21, 2015, now U.S. Pat. No. 9,558,665, issued on Jan. 31, 2017, which claims priority to provisional application Ser. No. 62/086,560, filed on Dec. 2, 2014; provisional application Ser. No. 62/092,100, filed on Dec. 15, 2014; provisional application Ser. No. 62/113,922, filed on Feb. 9, 2015; and provisional application Ser. No. 62/150,118, filed on Apr. 20, 2015, the entire contents of which are herein incorporated by reference.

TECHNICAL FIELD

The present disclosure relates to violation avoidance and, more specifically, to a method and system for avoidance of parking violations.

DISCUSSION OF THE RELATED ART

Local parking ordinances and rules frequently regulate where and for how long a vehicle may be parked along public roadways. A driver who parks a vehicle in a manner that is not permitted under such ordinances and rules may be described as having committed a parking violation. When a law enforcement officer such as a police officer or other traffic enforcement officer finds a vehicle parked in such a manner, a citation may generally be issued. This citation may be referred to as a parking ticket or parking violation citation. Accordingly, both the act of parking a vehicle in an impermissible manner and the ticket issued for doing so may be referred to as a parking violation.

Tickets issued for parking violations may be difficult to contest successfully and may carry a significant monetary penalty. Parking violations may also include penalty points toward your license. These penalty points may result in an increase in vehicle insurance, and after obtaining a certain amount of points within a certain time period, a driver's license may be suspended or revoked. Additionally, improperly parked vehicles can impede the flow of traffic, interfere with the operation of public transportation and sanitation services, and block emergency and essential services from being effectively delivered. Accordingly, it is in the public interest to increase adherence to parking rules.

However, parking rules, regulations, laws, citation codes, etc. (hereinafter, "RRLC") can be very complex, especially in large cities such as New York City, where there may be a large number of reasons for restricting where people can park and therefore a high demand for parking spaces. It is therefore common for drivers to commit parking violations, even when they have no intention to violate the rules. The constant congestion and lack of parking spaces paired with the continuing increase in the number of vehicles on the road also exacerbates the current rate of parking violations.

Although parking rules may individually be clear, sometimes parking rules are not clear enough when multiple rules are applied in real parking situations on the street, for example, where each of the rules applies only for certain times and on certain days. Drivers often find themselves receiving parking violation tickets due to a lack of understanding or confusion about the parking rules and signs at specific locations.

For example, the Rules of the City of New York (hereinafter "Rules of NYC") are clear in stating that a vehicle cannot be parked over a pedestrian crosswalk at any time. However, a parker might not understand how that rule applies to any given intersection, for example, if the crosswalk line is not completely drawn from one side of the street to another, the parker might misunderstand the incomplete marking and believe that parking is allowed since the vehicle does not overlap a painted crosswalk line. However, parking at that location is still a violation because the vehicle is technically parked over the pedestrian crosswalk, even though there is no clear completely painted line.

In a second example, people generally know they cannot park at or within a certain distance, e.g. 15 feet, of a fire hydrant at any time according to the Rules of NYC, but people are often confused as to what rules apply when the parking spot is separated from the fire hydrant by one or more intervening elements. For example, drivers may receive tickets when parking in illegal parking spaces which are parallel to a hydrant but are separated by a bike lane in between.

In a third example, parking signs may state that the time restriction for parking is not only during certain periods of time during a day or days of the week, but also for certain months or dates of the year. Because of the complexity of urban parking restrictions, drivers may be confused whether parking is permitted in a given location at a particular day and time. Drivers wishing to abide by parking rules may take care to examine signage that may be posted in the vicinity of a parking spot, but parking signs may be difficult to interpret when the signs seem to describe complicated rules. For example, a first parking sign may indicate that parking is permitted within certain hours while a second parking sign may indicate that parking is not permitted within other hours. To the extent that these hours overlap, parking is not permitted, however, a parker reading only the first sign and not the second may believe that parking is allowed, even when it is not.

SUMMARY

A system for providing parking guidance includes a central computing system in communication with a user and a plurality of additional users through a computing device. The central computing system is in communication with a unified database that stores parking violation related data including historical parking violation related data correlated to real-time parking violation related data. The unified database stores the parking violation related data clustered into data types consisting of commercial vehicle related data and non-commercial vehicle related data. The parking violation related data is further clustered by type of vehicle or type of vehicle plate. The historical parking violation related data includes parking rules, parking violation codes, parking violation statutory codes or abbreviations used by parking enforcement personnel, associated fines or other penalties, parking signs with one or more locations, associated parking meter costs with parking meter locations, notices for temporary or permanent parking prohibitions, tow away zone locations, or parking violation related data. A clock mechanism determines a present time and date. A user engagement panel receives the parking violation related data and contributes to an allocation of monetary or non-monetary rewards as consideration for contributing the parking violation related data. A location determining apparatus identifies a current location of the user. The location determining apparatus is in communication with the computing device. A processing apparatus, in communication with the central computing system is configured to analyze the parking violation related data to predict a violation of one or more parking rules or regulations using the current location, the present time and date, and the parking violation related data and to generate one or more notifications of parking violation related data corresponding to the current location and to the user type of the user. A display apparatus is in communication with the computing device for displaying one or more notifications with said parking violation related data to the user and the plurality of additional users.

A method for providing parking guidance includes the steps of utilizing a central computing system in communication with a user and plurality of additional users through a computing device. The step of utilizing a unified database storing parking violation related data including historical parking violation related data correlated to real-time parking violation related data clustered into data types consisting of commercial vehicle related data and non-commercial vehicle related data. The data is further clustered by type of vehicle or type of vehicle plate. The parking violation related data includes parking rules, parking violation codes, parking violation statutory codes or abbreviations used by parking enforcement personnel, associated fines or other penalties, parking signs with one or more locations, associated parking meter costs with parking meter locations, notices for temporary or permanent parking prohibitions, tow away zone locations, or parking violation citation records. A present time and date are determined. A user engagement panel for sharing parking violation related data is utilized. The user engagement panel contributes to an allocation of monetary or non-monetary rewards as consideration for contributing the real-time parking violation related data. A current location of the user is identified. The user type includes a commercial vehicle user type and a non-commercial vehicle user type, further categorized by type of vehicle or type of vehicle plate. The parking violation related data is analyzed to predict the user potentially being in violation of one or more parking rules or regulations. The one or more notifications with parking violation related data are issued to the user based on the user type to which the user belongs. The one or more notifications with the parking violation related data are displayed to the user and the plurality of additional users.

BRIEF DESCRIPTION OF THE DRAWINGS

A more complete appreciation of the present invention and many of the attendant aspects thereof may be readily obtained as the same becomes better understood by reference to the following detailed description when considered in connection with the accompanying drawings, wherein:

FIG. 1A is schematic diagram illustrating a system for using data from the unified database to alert drivers of parking violation occurrences in accordance with an exemplary embodiment of the present invention;

DETAILED DESCRIPTION OF THE INVENTION

Figure 1B:
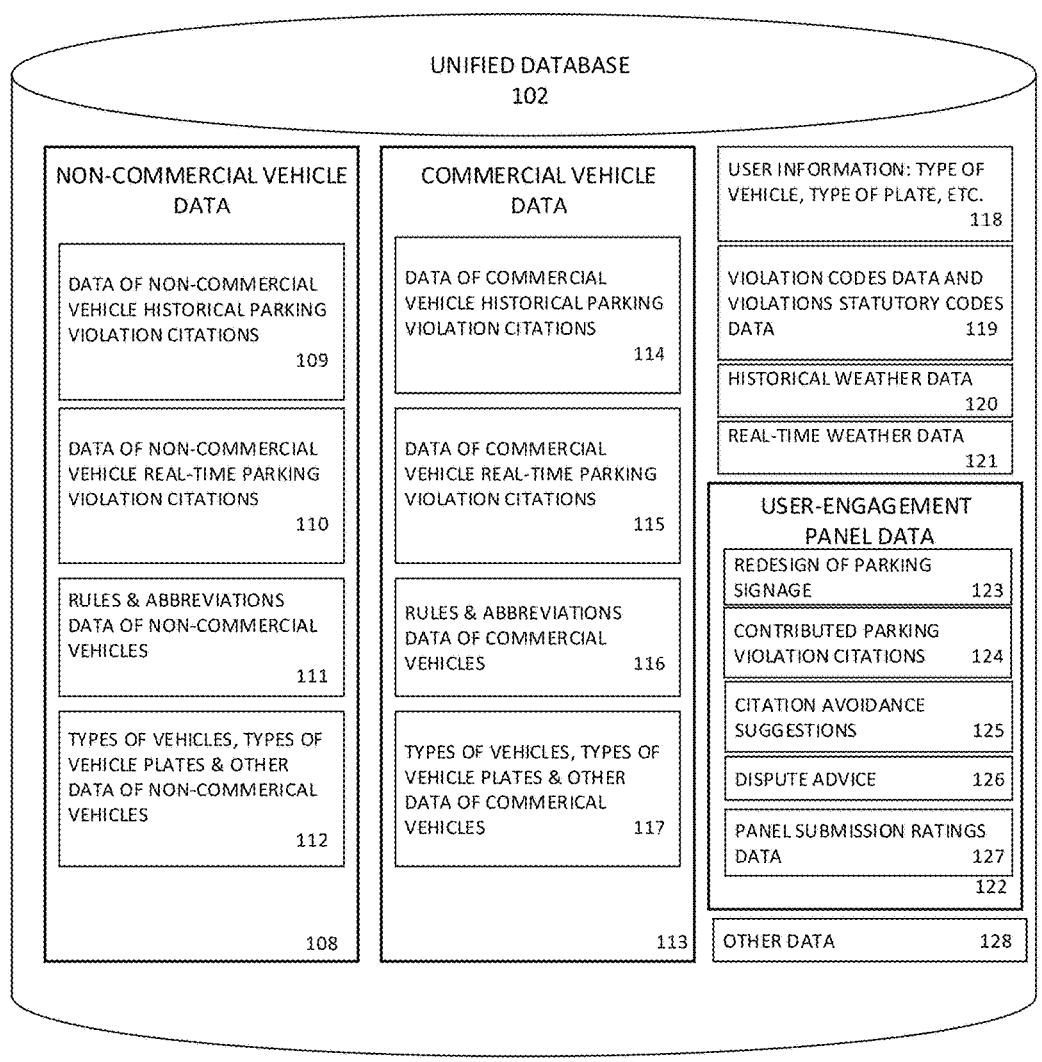
FIG. 1B is a diagram illustrating a unified database in accordance with an exemplary embodiment of the present invention.

The present disclosure is not intended to be limited to the specific terminology so selected, and it is to be understood that each specific element includes all technical equivalents which operate in a similar manner. Although the invention may be described herein with reference to a modern metropolis such as New York City ("NYC") as the main example for implementation, the system and method is applicable worldwide. The terms "driver(s)" may be used interchangeably with "user(s)," which is intended to encompass driver(s) to include those individuals who might not be a driver but, nevertheless, receive assistance by using the present invention. In addition, "user" is also intended to cover a wide array of subjects. A "user" may generally encompass private individuals and entities through its one or more representatives interested in reducing the amount of parking violation citations it receives; in essence, the word "user" is intended to describe any interested individual or interested individuals affiliated with entities registered with the present invention, not limited only to private individuals. The present invention may assist the user in avoiding parking tickets in an exemplary embodiment. The terms "parking citation(s)," "parking ticket(s)," or "parking violation citation(s)" may be used interchangeably, but their meanings may be the same: e.g. a ticket received by a driver for a parking violation.

An exemplary embodiment of the present invention may refer to the implementation of a system and method through a combination of hardware and software that operates on a portable computing device, which comprises various pre-programmed features combined and integrated with basic components including but not limited to one or more servers, unified databases, mobile end applications, web portals, network settings, etc. With the support of these components, information may be provided through user interfaces, such as a website, an application, or an in-vehicle navigation system. In addition, there may be one or more servers that may be in a distributed structure with support from data centers that may be located anywhere around the world. These implementations may be communicatively linked and cross-platformed with the electronic map display, indicators which convey parking related information, profile, and setting information etc., so that a user on a computing device may be provided with parking violation related data relevant to a specific location. The application may be communicatively linked to or integrated with other embodiments which can include a server, a user interface component, an interface component, and a server interface. The server interface handles communications exchanged between the server and applications instead of directly connecting the two applications, and all management and processing of the data may be administered through the service system server. Features can be implemented through one or more computing devices that allow for method steps to be processed and output by a processor.

According to an exemplary embodiment of the present invention, the computing device may be a device which allows a user to interact with the central computing system and with the user engagement panel through an interface which allows certain panel features to be accessed. This computing device may be a handheld mobile device, an in-vehicle navigation system, or another means of access such as a laptop computer, etc., and the panel features may be discussions relating to avoiding parking violation citations or contesting parking violation citations, for example. The computing device may incorporate several apparatuses by being communicatively linked with one or more devices which allow for it to communicate in turn with the central computing system. Such apparatuses may include a clock mechanism, a location determining apparatus such as a GPS receiver, and a display apparatus. These apparatuses may reside within the computing device such as in a smartphone, or may reside outside and share a wireless or wired link with the computing device.

An exemplary embodiment of the present invention may in part include a geographical information system (GIS) to capture, display, and otherwise analyze data. The GIS may integrate an electronic or digital map for instance as a layer such as GOOGLE MAPS, which is an electronic mapping service provided by Google, a subsidiary of Alphabet Inc., etc.) to be viewed on a computing device to view smart-phone, Web-based, or other storage media. With this integration, roadways may be displayed from the map database which presents the analyzed data as to the location and explanations of ticket violations that are easily understood by the user. The GIS system may integrate different layers, and data points with similar attributes can be isolated and output as a layer. That output layer would show all the instances of those data points that have similar attributes.

An exemplary embodiment of the present invention may connect internally with various functions of a computing device that include but are not limited to the clock function, phone call function, microphone, global positioning system (GPS) tracking for geolocation mapping (latitude and longitude coordinates), and/or camera, etc. The application can run on the computing device and utilize resources which may include microprocessor, memory, GPS, wireless connection and display. A notification can be accomplished through one or more media sources, such as the visual display or audio system, etc. A notification may include, but are not limited to, information about parking rules or regulations applicable to the identified present location of the user, reference to previously issued parking related violation citations, such as the number of previously issued parking related violation citations, for the identified present location of the user, parking signage related information, parking meter locations and associated parking meter costs, as well as reasons for issuance of parking related violation citations at that location.

An exemplary embodiment of the present invention may provide a platform for the collaboration and sharing of parking violation related data. Parking violation related data, which may be historical or real-time, may be crowdsourced or sourced from various sources, (hereinafter, "informational sources"), that include, but are not limited to one or more users or other interested individuals, entities such as the government, government agents, municipalities, non-government organizations (NGOs), private entities, and community organizations, or media sources. Media sources may include, but are not limited to, websites, blog posts, social networks, newspapers, magazines, professional articles, broadcasts, television programs, and any other resources where parking violation related data can be collected, etc. Some of the historical parking violation related data may be provided as public open data from the government agencies and may also be available through a request from the Freedom of Information Act, if not available through public government websites. Some information that is made private by some informational sources, such as government agents' websites, may be accessed by obtaining a user's permission to access that information. Once the information that needs an authorization has been accessed, the central computing system may notify a user of any upcoming fee and due date for a parking violation citation etc., as it might not be convenient for the user to access the informational source directly. However, the central computing system or the system administrator may additionally or alternatively obtain parking violation related data through the input from a user and/or interested individuals as well as private entities, for example, transportation companies, or any other organizations that specialize in transportation who may have access to issued parking citations or other parking violation related data. The database may utilize a collection method for the collection of parking violation related data from the informational sources. Parking violation related data gathered from media such as newspapers, blogs, social media, etc. may be collected and summarized manually, for example, by a system administrator or system employee, or automatically, for example, by an artificial intelligence algorithm, to correct, update, and supplement the unified database. This collected historical parking violation related data may also be corrected, updated, and supplemented by real-time parking violation related data. Real-time parking violation related data is considered to be real-time when one or more users share parking violation related data immediately. "Immediately" can be within a predetermined period of time, such as fifteen minutes from receiving the parking violation, or it may be virtually instant. If the data does not meet requirements to be considered real-time data, then the data is considered historical data, but it will still be used to update other historical parking violation related data already existing in the unified database.

Government released parking violation related data may be available through the applicable authority's website and/or publicly accessible open data. Although locations identified in such government released parking violation related data might not be as accurate as geolocation coordinates, such data is nevertheless useful. And, to better identify locations from government released data, these locations may be transformed to geolocation coordinates through any qualified third party software, that provides a location geocoding service for latitude and longitude coordinates, before the citation location data is input into the unified database.

Parking violation related data may also be obtained by crawling (e.g. systematic internet browsing) or otherwise connecting to relevant government or law enforcement websites that store parking violation related data for a specific user. Through this connection, the central computing system may be configured to notify a user of any pending ticket information. However, in order to do so, prior authorization may need to be obtained from the user to automatically search for that user's parking violation related data, such as pending violations. If there are any pending violations found, the central computing system may send a notification to the user about a currently pending violation. With the authorization from the user, the information from these violations may be input as data into the unified database to further build the updated comprehensive database to alert other users with reasons for potentially receiving a parking violation citation to help avoid these violations. Parking violation related data may also be sent to a user who has pending parking tickets. For example, in NYC, the threshold amount is $350 in unpaid parking tickets before a driver's vehicle may be towed regardless of whether or not a vehicle is legally parked, and the central computing system may be able to send an alert about reaching this threshold. Accordingly, the user may receive a notification indicating that the user has for example, $300 in unpaid parking tickets as it is approaching the threshold amount of $350 and the user is at risk of having a vehicle towed once the user reaches $350 and has not yet paid these accumulated ticket penalties. The user may be assisted in claiming the vehicle by accessing relevant towing information, if the user's vehicle has been towed as a result of the accumulated unpaid parking tickets.

According to an exemplary embodiment of the present invention, various parking violation related data as reported by a user, i.e. crowdsourced data, may be periodically or continuously collected and analyzed to build a more accurate, up-to-date database. As used herein, "crowdsourcing" is a distributed problem-solving method that utilizes online and offline resources to compile services, ideas, and/or content by the solicitation and/or capturing of data from a variety of people native to a special community that is targeted by the crowdsourced subject. Crowdsourcing may be used in gathering data that is not provided through other sources. Crowdsourced data may be in the form of real-time data or historical data. Incentives may be used to encourage reporting of parking violation related data by a user to correct, update, and supplement the data in the unified database. This incentive structure paired with an administrative quality control center may be used to ensure the quality and reliability of the data in the unified database, as this data is subsequently used to prevent a user from receiving parking violations and therefore needs to be kept to high standards of accuracy and reliability. Each data input, whether sourced or crowdsourced, historical or real-time, may be assigned a unique tracking number, allowing at least the system administrator to track the data back to its original source if necessary.

An exemplary embodiment of the present invention may promote transparency and accuracy of parking violation related data in the unified database gathered from various sources by utilizing a platform for a user to access the data in the unified database in a user-friendly, application interface. To build the unified database, raw parking violation related data, which may include but is not limited to parking violation citation data, may be obtained from informational sources, uploaded to a computer microprocessor, and formatted to include only relevant data used for running analyses and providing notifications. The uploaded parking violation related data may be then split into two sets for cleaning and uploading into the server. The first set may be parking violation related data which is already verified as to having all the necessary information in the right format; whereas the second set may be parking violation related data that needs to be reformatted to include all the necessary information. Once all parking violation related data has been cleaned, the location data may be extracted in a data frame to be used in a third party geocode application program interface (API), for example, GOOGLE GEOCODING API, which is a location geocoding service provided by Google, a subsidiary of Alphabet Inc., or SMARTSTREETS, which is a location geocoding service for latitude and longitude coordinates provided by SmartyStreets, LLC, etc. to output a file with all the geocoded information of relevant locations, where the file may be a file such as a .csv file. Any other type of technology may be adopted or developed to more accurately identify the geolocation related to a parking violation. The output may be reviewed and corrected by the system administrator for accuracy and completeness. Parking signage data and RRLC data files may also be uploaded, cleaned and merged with the citation data into the unified database.

The raw data entered, processed, stored, and analyzed may include but is not limited to: the type of violation; the causes or reasons for the violation; name of law enforcement officer who issued the ticket; law enforcement officer comments on the ticket; registration state; plate type; vehicle type; issue date; violation code; violation statutory code; issuing agency; violation time; house number; street name; law section; subdivision; days parking in effect; from hours in effect; to hours in effect; violation description; any other relevant factors; and/or other parking violation related data from the unified database, etc. Reasons for parking ticket violations may include but are not limited to: standing in a no standing zone, where it is prohibited to wait or stop to load or unload packages or merchandise at curbside and only allows for stopping to expeditiously drop off or pick up passengers; stopping in a no stopping zone, where it is prohibited to wait, stop to load or unload packages or merchandise or drop off or pick up passengers; parking tickets related to blocking areas, such as parking in front of or blocking an entrance, exit, or crosswalk, as well as blocking a mailbox; parking within a prohibited zone based on a distance from a bus stop or fire hydrant; parking too close to a railroad crossing; parking restrictions based on timing such as holiday, parade route, or other special event parking that only applies selectively; and parking prohibitions that relate to double parking, whether for a certain amount of time or any time at all. Some parking prohibitions relate to a revolving schedule, such as street cleaning parking prohibitions, which happen on given days of the week between two different times. Prohibitions can also relate to user oversights, such as remaining parked after a time expiration. Parking tickets can also relate to parking within a zone or area that is restricted to certain types of vehicles or people, such as parking in a handicapped spot or within handicapped zone or in a bike lane, in addition to parking in a private parking zone or a zone with a required permit. Furthermore, parking tickets can relate to prohibitions or limitation for parking for certain for certain kinds of types of vehicles, such as motorcycle-only parking or parking a bicycle in areas banning bicycle parking. In addition, there may be selective zones that have different penalties associated with them, such as parking in a tow-away zone. Further, reasons can include parking in the wrong direction, or parking longer than the maximum allowed time, or any other conceivable reason, etc. These reasons are mined for notifications as well, as the notifications are based on the data that is stored in the database. For example, in NYC, the Department of Finance uses violation codes to issue parking tickets while these violation codes contain reasons linked to violation statutory laws written into Chapter 4 Section 4-08 of Title 34 of the Rules of NYC. Parking violation reasons may be matched with their respective violation codes, which may be used to infer parking violation reasons for specific locations and generate alerts applicable to a user based on the user type.

An exemplary embodiment of the present invention may be configured to integrate algorithms to detect duplicate data, if the tickets issued on dates and times match those in the database, which may be labeled as duplicate data and may be automatically removed from the data set. However, tickets issued on dates and times not included in the database may be added to the database, and notifications may be updated to properly reflect added data to then properly alert a user with updated information.

The database may also include other types of publicly available useful and critical resources, for example, abbreviations and their common meanings as used by law enforcement. Law enforcement officers often use abbreviations when issuing tickets. On the ticket, abbreviations may appear in the area where the officer specifies the violation and/or location of the violation. Abbreviations may be processed and stored in the database by gathering data from publicly available sources to provide the most accurate and up-to-date meanings. The user may be able to check the language to automatically change the abbreviations to plain English meanings according to location when typing them into the computing device. The function may also be used when the user reports a ticket that contains abbreviations. For example, a user receives a ticket violation for parking a vehicle in violation of the law at a certain location and intends to report. The ticket violation states, the "Place of Occurrence" is "E/S Calloway St. 0 ft N/of Otis Ave." The user may, for example, type the abbreviated language into the computing device when reporting, and then the central computing system may automatically change the abbreviations to plain and easily understandable English explanations and then convert the address into a geolocation. For example, tickets with confusing abbreviations, "US Calloway St. 0 ft N/of Otis Ave." would be changed to "East Side Calloway Street Zero feet North of Otis Avenue" and then used to create the accurate geolocation through a third party's geolocation API to be entered into the database. The geolocation can then be used to alert other users. A user may earn a reward by uploading an issued parking violation or report any incorrect or inconsistent information; the database may then be corrected, updated, and supplemented accordingly to reflect the changes, in turn making notifications more accurate. These corrections may be supported by proof, such as a photograph or statutory update. The user may, in such instances, be required to furnish such proof.

The database may also include parking signage information, for example parking signage location information and parking signage images from the websites of various government sources (e.g. Department of Transportation, hereinafter "DOT"). Parking signs that apply to a user's current location may be automatically displayed for the user on the computing device after a user temporarily stops or parks in a location. If the user does not understand the signage or has any questions, the user may select (e.g. press upon on a touchscreen) the image of this signage on the display to open the user engagement panel function, where the user may report the signage information and view any exchanged information from other users for this signage that is connected to the current location. It is to be understood by one of ordinary skill in the art that "user engagement panel" herein is used to denote a panel a user can access where that user may exchange parking violation related data such as information as well as share relevant ideas. This may be accessible through a terminal or computing device such as a smartphone, tablet, or other means of internet access. A user may interact with the user engagement panel through an electronic touch-sensitive screen on a mobile device or may use any other interactive computing device. Any other potential term may be used to describe this function, such as "forum," "discussion group," "online meeting," etc. The term "user engagement panel" serves this purpose herein.

The user engagement panel may be used by one or more users, or other interested individuals, or entities such as the government, government agents, municipalities, non-governmental organizations (NGOs), private entities, and community organizations, or media sources. If parking signage information is not available from government resources, the user may choose to submit parking signage information for the applicable parking signs with the possibility of receiving certain monetary or non-monetary rewards. Accordingly, a user might not have to physically leave the vehicle to spend time walking to the sign to figure out if parking is allowed, putting them at risk of receiving a ticket during this time. Instead, the user may receive a notification with applicable parking signage for that specific location. The notification may be based on user type, vehicle type, and/or plate type. The parking signage image notification may include a rating system, so the user may rate the notification positively or negatively, confirming accurate information and indicating the presence of inaccurate information.

According to an exemplary embodiment of the present invention, monetary and non-monetary rewards can cover a wide range of tangible or intangible items. For instance, a non-monetary reward may be the granting of access, for a time, to certain premium system features, or it may be a user or subscription fee waiver. Monetary rewards may include rewards such as reimbursement for ticket citation payments, or payments of tickets in part or in full or other predetermined monetary reward, in addition, monetary rewards may also be related to parking meter time, etc.

A potential user may be asked to register with the service by providing driver's license pertinent information such as name, type of plate, type of vehicle, the state or country issuing the driver's license, and an email address to create a user ID for each user of the application. User IDs may be necessary for the purposes of tracking reports and ratings made by each user. Credit card and/or debit card information may also be requested for subscriber fees for certain services provided for a certified user. A certified user may be allowed to use various features of the application which include but are not limited to reporting data and rating data. The subscriber fees collected may also directly or indirectly fund the source used to help pay for user's incurred tickets as a part of the incentive structure in order to obtain more parking violation related data. For instance, a user can upload their parking violation citations to the user engagement panel, and other users can give positive or negative ratings depending on at least the accuracy of the provided citation. The data in the unified database may be updated, corrected, or supplemented to reflect new parking violation related data, which may lead to a corresponding notification being updated accordingly. Once the notification reaches a predetermined number of positive ratings, confirming thereby that the data conveyed by the notification is correct, then the user who shared that new parking violation related data may receive a monetary or non-monetary reward. A monetary reward may be funded from collected fees. A user may be limited, however, in how many times the user may vote on a single submission in the user engagement panel in order to root out indecent or fraudulent behavior which may be undertaken to reap a reward unfairly, such as rigging self-submitted parking violation related data to be positively rated.

An exemplary embodiment of the present invention may include a user profile database configured to store user information and associations between each user and the user's computing device after registering. Once registered, a user may set and change their information in their user profiles, if desired. Settings that may require a user's input or preference may be subsequently changed by the user within the settings (e.g. on/off). For example, the user may change the type of vehicle the user is currently driving. Accordingly, this is also applicable to the type of plate associated with the vehicle. The following types of user may be recognized: non-commercial vehicle user and commercial vehicle user, further categorized by type of vehicle and type of vehicle plate. Since different RRLC may apply to non-commercial and commercial vehicles resulting in different types of ticket violations which may be categorized, a user who indicates in their profile that they drive a commercial vehicle may be automatically marked in the different category for only commercial vehicles. Non-commercial vehicles may include but are not limited to: passenger cars, mini-vans, SUVs, etc. Within the commercial vehicles database, the type of commercial vehicle may be split into categories, which may include, but are not limited to, tractor-trailers, trucks, buses, taxis, and limousines, etc. Parking rules applicable to commercial vehicles might not also be applicable to non-commercial vehicles, and accordingly, data may be separated from different types of vehicles into different categories so that the tickets may also be categorized depending on the vehicle and the violation reasons.

According to an exemplary embodiment of the present invention, the application may allow different types of user to enter parking violation citation information which may be categorized in the database according to different data types. For example, drivers of non-commercial vehicles may receive tickets for parking in commercial vehicle only standing zones which only permit commercial vehicles to load and unload cargo. Therefore, the citation database may include citation data from non-commercial vehicles and commercial vehicles, which may be separately labeled according to the vehicle type. Vehicle type data may show different types of vehicles which commit the violations. Although there are two types of vehicles that have their respective databases, the two types may be combined and integrated in one unified database. Different types of user may then be issued a notification with the type of data that correspond to their user type. A notification may be made more accurate since tickets may be grouped in separate categories depending on the type of vehicle and types of vehicle plates, which may be included in commercial vehicles or non-commercial vehicles.

According to an exemplary embodiment of the present invention, the user engagement panel may be preset to focus on a particular area, such as a user's identified current location. When a user opens the user engagement panel, the content that may automatically display may be based on the user's present location. A user who receives a notification may click on a notification to access more details about a potential parking violation. If the user is still not satisfied with those details, the user may use the user's computing device to connect with the user engagement panel, where the content that automatically displays may be information in even greater detail. This content may include parking signage, and the user may submit a question to the user engagement panel based on the user's specific location. However, the user engagement panel may also be accessed for content in other areas. For example, this may be a user in New York who intends to rent a truck to move to Florida. The user might like to see parking violation related data applicable to a certain area where the user intends to unload the truck. Since the truck is usually considered a commercial vehicle and different states might have different regulations regarding parking and unloading a commercial vehicle in the street, it might be convenient for the user to get familiar with parking violation related data applicable to that certain area prior to the move to avoid receiving a parking violation related citation. It is to be understood by one of ordinary skill in the art that this is one example in a wide array of potential reasons a user may want to access user engagement panel content for areas encompassing that user's immediate surroundings.

According to an exemplary embodiment of the present invention, a user can also tailor which notification that user wants to see. In addition to having a notification issue on the basis of what kind of vehicle the user is driving, or what type of vehicle or what type of plate, the user can specify further what he or she does or does not want to be notified about. The user can preclude a single notification or a whole category of notifications. In addition, the user can specify the type of information he or she would like to see in a notification. For example, the user may specify to not see any image of signage, instead opting to see simply a short description of that signage. In another example, a user who parks often in the same area each day could specify that the notification relevant to that parking location does not need to be displayed each day, as the user may be very familiar with the rules. Whole categories of notifications or specific parts of each notification may be able to be turned off, too. For example, a user might not feel the need to see a notification that serves as a reminder to pay meter fees or other violations, which may occur solely due to the user's disregard of obvious or known parking norms. If such violations do occur and the user attempts to contribute parking violation related data regarding them it, a system administrator may preclude this data from being added to the unified database, or certain parking violation data may be precluded automatically. For example, this would be a citation issued for an expired meter, or a citation issued from blocking a driveway— though these rules may differ by location, those violations might not be relevant to a user who is well informed about those rules. In addition, a user may limit a notification to certain times, such as having parking reminders issued on nights and weekends while being turned off during working hours during the week. This is, however, an example and not intended to limit in any way the time customization that the user can specify with regard to which a notification is issued, nor is it intended to limit what information does get incorporated into the unified database.

Since there are different types of commercial vehicles, the central computing system may also sort and categorize data depending on vehicle type, plate type and the issuing agency of the specified parking violation. Information may be inferred depending on plate type, vehicle type and issuing agency. The same rules may apply to the same category of vehicle or the same type of vehicle plate, which may be regulated by a specific agency. Different issuing authorities may have different rules and regulations that apply only to the vehicles they have the authority to regulate. Accordingly, violation citation data may be categorized based on type of vehicle and also type of vehicle plate in order to provide an accurate notification to a user who based on user type. This categorization may be applicable to both commercial and non-commercial vehicles. However, law enforcement may have the authority to regulate all types of vehicles and issue parking violation citations to them all. Accordingly, a notification may apply to all types of vehicles or all type of vehicle plates, but a notification may apply selectively to different types of vehicles. Parking violation related data may be sorted into the same categories that parking rules may apply, where each violation citation datum includes but is not limited to time, reasons, location, type of vehicle, and type of plate etc. for the received parking violation citations. Since some rules may apply to some vehicles and not to others, depending on the type of vehicle and type of vehicle plate, then a notification may be sent to all applicable vehicles. For example, in NYC, the Taxi and Limousine Commission (hereinafter, "TLC") regulates commercial vehicles which have a plate beginning with the letter, "T." TLC officers have the authority to issue specific types of tickets unique to TLC vehicles based on TLC regulations but do not have the authority to regulate other commercial vehicles, for example buses, which are regulated by the DOT.

According to an exemplary embodiment of the present invention, different parking violation related notifications apply in different situations. A notification may be generated from the unified database that involves the processing and analysis of several data set components: available historical and compiled data from informational sources; real-time or historical data as crowdsourced from user's input parking violation related information; crowdsourced parking violation dispute related information to assist or advise ticket disputes; rules and abbreviations data; parking meter locations and parking meter fees data; ticket dispute data from a user and any and all supplemental information as provided and/or verified by the system administrator, all of which may be subject to review and/or ratings. Data may be labeled in the database according to its source. The exemplary embodiment of the present invention may use a team of professional individuals with relevant expertise in parking violations and/or parking rules to verify the accuracy of the data in the database. A notification may be corrected, updated, and supplemented depending on data gathered and user ratings.

A notification may be short, stating the reasons on why a user might not park in a particular location with other brief information that summarizes the historical parking violation related data at the location. This notification may be brief because a user may receive this notification on his or her display apparatus and may be either driving when looking for parking or distracted from conducting other activities. A notification alerting a user may be generated based on the different categories, types of vehicle, and/or type of vehicle plate applicable to the user receiving the notification. One type of notification may include information about the potential violation such as dates and time frame applicable to the violation, historical summary of violation citations at the current location, reason(s) for the violation, etc. The historical summary of ticket information may contain a time frame from certain dates that are reflected in the data (for example, date, month, time, etc.), parking violation reasons, applicable penalties, total penalties collected, categories of ticket types and their applicable penalties, and the number of tickets issued within the time frame to educate the user and act as persuasive information in order to inform the user of the potential consequences of parking in a certain location to avoid the user from taking a chance to park in the location with violations.

Another type of notification may appear when an exemplary embodiment of the present invention displays a comparison of parking rules applicable at different jurisdictions, for example, rules that apply at the current location and rules of the state that issued the user's driver's license. For example, a user whose driver's license is issued in Connecticut might not know that parking is not allowed within 15 feet of a hydrant in New York since the rule in Connecticut is set at 10 feet away from hydrant. Among other instances, the user may be able to view this notification information at any time, by pressing a button on the screen of the computing device at the location to check for parking violations or to check for different parking rules. A user may rate the information on the notification and also report the notification to the system administrator if they think there is inaccurate or false information.

As an exemplary embodiment of the present invention records and stores accurate geolocation GPS coordinates (longitude and latitudes) of the user's computing device, the notification sent to a user can be customized and localized to the user's location based on a predetermined radius. Since the database stores and analyzes RRLC from different municipalities and/or other authorities, geolocation and applicable RRLC may be matched to send a notification according to the user's user type and current location or a location indicated at a user's request. For example, the location identifier may use the user's present location to place the user within a particular set of jurisdictions. This function may be useful for a user who drives across state or country lines and are unfamiliar with the RRLC from different states or countries. The unified database may have the user's driver's license information as the user may enter and store the information of the driver's license with the state or country who issued the driver's license when registering a profile. Using the location from where the user's driver's license was issued with a user's current geolocation data, the central computing system may send a notification for different rules or a summary of different parking rules to the user according to the geolocation as it changes. The user may press a button on the display of the computing device to view the summary of the different parking rules when comparing the location that issued the user's driver's license with the user's current location. The present invention might not only be applicable within the different states of the United States but may also be applicable between different countries worldwide.

Since a notification is short and meant to alert the user with quick, summarized information about the potential parking violation, the user may utilize the user engagement panel, including but not limited to a forum module, to obtain more comprehensive and detailed information from posts which include but are not limited to inquiries, responses, discussions, pictures, videos, written descriptions, and any other information that may be posted. The information submitted to the user engagement panel is subject to ratings from additional users. The additional users may provide feedback, suggestions, negative ratings, positive ratings, etc. Once the submitted information reaches a predetermined number of positive ratings, that information may be used to correct, update, and supplement the unified database accordingly. The submitted information will transform to a notification to be issued to a user. This notification is then subject to further ratings by additional users with firsthand experience.

A user with firsthand experience is identified as a user who has received a notification with parking violation related data about a specific location by passing within a predetermined radius of that specific location. This radius may be set by default or preset by the user through the settings. For the purpose of identifying the firsthand experience, the central computing system may be connected to the Internet and a computing device capable of determining a user's geographic location and transmitting the identified geolocation of the user to the central computing system.

Once the notification reaches a predetermined number of positive ratings, then the user who submitted the initial information which may be later transformed to a notification, may receive a monetary or non-monetary reward for the valuable contribution. Whereas the notification that reaches a predetermined number of negative ratings may then correct, update, and supplement the unified database.

While reported ticket data is used to generate or update the content appearing in a notification, all of information provided in ticket sharing may go to the ticket sharing user engagement panel (e.g. photos, videos, etc.). A notification may be displayed when the user is approaching the specific location where the user may potentially receive a parking violation citation. Information provided by a user in the user engagement panel may correct, update, and supplement information provided in a notification. The combination of receiving a notification and accessing a user engagement panel may provide more useful and extensive information for a user because a notification provides quick, time sensitive information while the user engagement panel provides the detailed, extensive information useful to gain full knowledge of the situation.

The user engagement panel may incorporate two aspects: it may be connected to the specific location of violations on the electronic map or a general user engagement panel where a user may discuss general ideas not related to specific locations. The user can press on a location related to parking violations within the map display to choose "Panel," to access the user engagement panel, which may include different categories where information may be exchanged between users, for example, tickets sharing; questions or answers or comments; parking signs; and/or other categories not included in the above, if any etc. The content which is automatically supplied in the user engagement panel is based on the user's current location. The tickets sharing category may allow a user to view comprehensive, detailed parking violation related information for a particular location including but not limited to a copy of the ticket without sensitive information; reasons for the violation; time of the violation; and an advisory to avoid the violation, etc. The questions or answers or comments category may allow a user to ask any questions, input any answers, and input any comments related to parking violations for the location in addition to viewing all this information contributed by other users. The parking signs category may allow a user to exchange information regarding parking signs, such as redesign of a parking sign regarding, or translation to a different language or clarification of content. Other categories not included in the above may be added or deleted at the discretion of the system administrator. When a user has an inquiry regarding parking violation related information for a location, the application may allow the user to post using the user engagement panel to obtain more information. The user-input information may be open to comments and/or ratings from other users. Comments with the most positive ratings may be given priority ranking for the position of the comment on a list. If the positive ratings reach a predetermined number then the user may receive a reward. The user engagement panel may allow other users to provide various comments that include but are not limited to information on whether a dispute may be successful based on provided circumstances from the user who received the parking ticket.

A user may use the user engagement panel to post a picture of a parking or street signage at a specific location and ask about the plain language of the sign. Drivers often experience difficulty in understanding parking signs, especially when there are multiple signs for different parking rules. In addition, many drivers might not have a strong command of the English language, which leads to further difficulties in interpreting the signs. Therefore, the user engagement panel may provide information on s the parking signs associated with a specific location and translate these parking signs not only into another language, but also into easy-to-understand, plain-English terms. Since some parking signs are confusing, a user may participate in redesigning them to make new designs. A user may create redesigns or translate traditional parking signs to different languages to be more understandable. Their design images may be subject to a rating system, and the top design which generates the most positive ratings over a certain number after a certain amount of time may be rewarded. The top-rated design may remain at the top of the list so other users can view and easily understand the meaning of the signs.

The user may be allowed to do a general search for violations in the specific location within the user engagement panel, and may further search based on type of vehicle or type of vehicle plate. If the search does not result in an answer that satisfies the user, the user may have the option to post their own inquiries in the user engagement panel connecting to the specific location. By educating users through sharing at least their own parking violation related experience, other users may be more conscious of their parking actions, which may help in the avoidance of receiving tickets and/or overall reduction of parking ticket violations. All functions of the application, such as a notification and the user engagement panel for example, may be available in different languages that can be changed by the user. An exemplary embodiment of the present invention may use a third-party service and/or API, for example, GOOGLE TRANSLATE, which is a language translation service provided by Google, a subsidiary of Alphabet Inc., or the system administrator may hire professionals with expertise in parking violations and also competent translators to translate the content to different languages or provide explanations in plain English. A user may also translate information, which may be subject to positive and negative ratings.

An exemplary embodiment of the present invention of the application may also connect to a third-party electronic map, for example, GOOGLE MAPS, which is an electronic mapping service provided by Google, a subsidiary of Alphabet Inc., etc., to provide a street view function on the user engagement panel for specific places with a ticket occurrence. Other media, for example, photos, videos, etc. for the location may also be provided by a user or employee of the system. This is especially useful for those locations with a predetermined number of violations where more information should be provided or for those locations where a user may be unfamiliar. The user's privacy or the public's privacy may be protected when uploading photos, videos, etc.

A notification may be sent based on violations with time restrictions. Time restrictions may be a time frame where parking is not allowed within a certain location, which may be used to help produce a time-sensitive notification when applicable. The data may reflect an accurate time frame for these violations rather than track each time as its own specific instance of a violation and may notify a user about the entire time frame when parking is prohibited, and not just a specific time point as indicated on the ticket. In addition, when parking violation related data is identified as time sensitive, whether submitted through a user engagement panel or collected from another source, the system administrator may be given the discretion to immediately incorporate this time-sensitive data into a notification, because there may be a need to notify a user as soon as possible, such as in the case of a temporary notice or a tow away zone, and because some information regarding a time-sensitive prohibition may be preferable to no information. In this scenario, the time-sensitive data may not need to reach a predetermined number of positive ratings prior to being incorporated into a notification. If a notification with time-sensitive parking violation related data reaches a predetermined number of negative ratings, this time-sensitive data may be removed from the unified database.

Time frame data may be applicable to several situations: for example, "No Standing Anytime" where the time frame would need to indicate 24 hours, so any user whose geolocation data shows a location that is in a No Standing Anytime zone may receive a notification at any time. Time frame data may also be applicable to alternate-side parking, for streets that do not allow parking during certain times due to government street cleaning services, which for example is usually applicable for half an hour (e.g. 9 AM-9:30 AM) or temporary tow zones notices, which for example are usually applicable for a day or a few days. The unified database may connect with the computing device to send an automatic notification, reminding the user to move a vehicle due to street cleaning rules.

Although government websites may provide information on locations and the applicable rifles for parking signs, the data might not be complete or may be unavailable. Therefore, the user engagement panel allows for user reporting of parking sign information, which may be used to generate a notification. The user engagement panel may also allow a user to update parking restriction conditions to indicate for example, the condition has been changed temporarily or permanently, etc. The government agency or law enforcement agency, such as the police department may release information on their websites or post a temporary notice on the street regarding a temporary notice of "No Parking" areas on certain streets for certain time. Temporary notices also include no parking notices due to some special events, for example gatherings, road repairs, movie productions, etc. However, people might not know of or might not necessarily see these notices posted on the parking sign or the notices might not readily be apparent; when a user parks his or her vehicle the user may be notified by the processing apparatus of any applicable temporary notices for these reasons. When a user discovers the information, the user can report the notice to the user engagement panel and upload a picture of the notice, whereby the unified database may apply the stated parking rule to the whole street. As a result, a user who has parked his or her vehicle on the applicable street during the applicable time frame and/or distance frame restrictions or who has indicated in the settings that be or she wants to receive a notification for any temporary notices on the street may receive a notification. The central computing system may prevent this user from potentially receiving a ticket or being towed away since the notification may warn the user of the temporary notice. This reporting method may also be applicable to other situations where any RRLC may be updated if the unified database does not detect it by itself. A user may submit and upload any relevant information through various media that include but are not limited to: photos or images from cameras, sensors, videos, hand drawn pictures, written descriptions, and any other mediums to accurately describe the situation for the location through the user engagement panel. To encourage a user to report the discovery of any changes in RRLC, a user may earn rewards. The system administrator may also hire employees or third party contractors to report the temporary notices so a notification may be sent to the user.

According to an exemplary embodiment of the present invention, there may be an occasion when the processing apparatus may find a parking violation by directly correlating the user type with the present location and the present time in mining the unified database for parking violation related data. A direct correlation may be in such a case where there has been a parking violation citation issued at the current location at the current time, which was issued based on a parking prohibition relating to the same user type, and also relating to the same type of vehicle or type of vehicle plate. For example, a direct correlation may be when a non commercial vehicle user is given a notification that warns against parking at Location X at 5:15 PM on a Tuesday because there is data in the unified database which matches the situation: a non-commercial vehicle receiving a parking violation citation for parking at Location X at 5:15 PM on a previous Tuesday. At least these three points—type of vehicle, location, and present time—all correlate directly. In this instance, a potential parking prohibition does not need to be inferred, as there is an exact data point which establishes the basis for the notification.

According to an exemplary embodiment of the present invention, the processing apparatus may infer a parking prohibition based on location to warn a user about the potential risk of receiving a parking violation citation at the user's intended parking location. The processing apparatus may analyze parking violation related data that is available in the unified database for the surrounding locations, and compare such data with RRLC. If the intended parking location of the user falls between at least two locations with a record of previously incurred parking violation citations applicable to the user type of the user, the processing apparatus may infer that the user may receive a parking violation citation at that intended parking location. To properly make an inference, each of the two previously incurred parking violation citations may be based on the same reasons, and that reason may correspond to the inference. Those reasons may be the reason for the same parking violation citation, such as parking in a No Parking Any Time zone. An inference may not be made accurately if one parking violation citation is for an expired meter fee while the other parking violation citations is for parking in a loading zone. Furthermore, some parking violation citations may not be the basis of an inference such as a parking violation citation issued for the reason of an expired meter. The distance between locations which the intended parking location falls between may depend on various factors. One factor which may affect the distance between those two locations may be what RRLC applies. For instance, the distance may be shorter if that distance is based on a fire-hydrant parking rule; if there was for example a 15-foot parking prohibition on each side of a fire hydrant, the parking violation citations may only be within 30 feet. In another example, there is a parking prohibition relating to parking on a road running alongside a military base. The distance between two locations may be greater because the scale of the parking prohibition. In this example, an inference based on location can be made where the distance between the two locations may be greater because of an RRLC of greater scale. The central computing system may predetermine this distance based on the applicable RRLC. In addition, the distance may be predetermined based on location, where the distance in a denser city with higher instances of parking violation citations may be smaller than that of a rural area with low instances of parking violation citations. The predetermined distance between locations may be on the same side of the street on a city block, or it may be a shorter predetermined distance between locations. For example, the unified database has a record of a parking violation citation received by a vehicle at Location A, address being 130 31st Avenue. The unified database also has a record of a parking violation citation received by the same or different vehicle parked at Location C, address being 134 31st Avenue. The processing apparatus may analyze these parking violation citations to infer that the same or different vehicle parked at Location B, address being 132 31st Avenue, may receive a parking violation citation. In this example, the predetermined distance relates to three addresses along the same side of 31st Avenue: 130, 132, and 134.

According to an exemplary embodiment of the present invention, the processing apparatus may infer a parking prohibition based on time to warn a user about the potential risk of receiving a parking violation citation at the user's intended parking location at the present time. Thus, the processing apparatus may analyze parking violation related data that is available in the database for the user's intended parking location and that carries a timestamp close to the present time. If present time is associated with at least one parking violation citation within a predetermined time frame, the processing apparatus may infer that the user may receive a parking violation citation at that intended parking location at the present time. The predetermined time frame may be predetermined based on applicable RRLC, or the predetermined time frame may be a time frame that is a time frame based on the time of issuance of a parking violation citation. This time frame may also be a time frame such as one, two, or three hours, or a larger time frame such as ten hours or any other duration depending on relevant factors, such as a prohibition for street sweeping which applies for an hour and a half. Another parking prohibition may be no parking between 9 am and 5 pm, where the time frame may be an eight hour time frame. For example, the unified database has a record of a parking violation citation received by a vehicle parked at Location A at 9:13 am, where the known RRLC is a parking prohibition due to street sweeping which applies from 9:00 am-10:30 am. The time frame in this scenario may be predetermined to be an hour and a half based on the duration of the street sweeping prohibition. The processing apparatus may analyze the parking violation citation to infer that the same or different vehicle parked at Location A may receive a parking violation citation if a user parks at 9:51 am, because 9:51 am is within the predetermined time frame. In another scenario, the unified database has a record of a parking violation citation at Location H at 7:15 pm. A notification may be issued to a user who intends to park at Location H at 7:21 pm. This notification may be issued because 7:21 falls within the same half-hour time frame as the parking violation citation.

According to an exemplary embodiment of the present invention, the processing apparatus may also infer a parking prohibition based on time by analyzing similar times on different days of the week. If the times are at the same time every day, or at the same time on the same day, the processing apparatus may infer that there may be a parking prohibition at this time on this day, or this time every day. For example, a vehicle at Location B at 9:30 am on Tuesday receives a parking violation citation. The same or different vehicle at Location B at 9:30 am on Wednesday receives a parking violation citation. The same or different vehicle at Location B at 9:30 am on Thursday receives a parking violation citation. The processing apparatus may analyze these parking violation citations to infer that the same or different vehicle parked at Location B at 9:30 am on a Friday may most likely receive a parking violation citation. In another example, a vehicle at Location C at 9:30 am on Tuesday, September 1st receives a parking violation citation. The same or different vehicle at Location C at 9:30 am on Tuesday, September 8th receives a parking violation citation. The processing apparatus may analyze these parking violation citations to infer that the same or different vehicle parked at Location C at 9:30 am on Tuesday, September 15th may receive a parking violation citation. One of ordinary skill in the art may appreciate that a notification based on an inference may not be completely accurate, as implied by the word "infer," However, it is also to be understood that a notification may be corrected, updated, and supplemented by ratings from users. A notification containing information about an inference is valuable for a user because it may be sent to a user even when there may not be a large store of information available; in this manner a user may be given reasonably accurate information in situations with potentially little data regarding parking violations.

According to an exemplary embodiment of the present invention, a user may receive a parking violation citation notification from the processing apparatus. The user with firsthand experience with the notification for this location can then rate this notification based on the inferences. The positive ratings are used to verify that the inferred violation is accurate. When the inferred violation reaches a certain number of positive ratings that may be predetermined, the processing apparatus confirms the validity of the inferred violation. The inferred violation may then become a direct correlation violation and may no longer need to be inferred by the apparatus, as it may be a permanent notification until verified contradicting information proves otherwise, where when inferred potential parking violations reach a predetermined number of negative user ratings, the notification which conveys the inference may be withdrawn. This may also happen when there is a parking violation citation that is issued in a location that has an inferred potential violation. For example, when an inference is proven by a citation at some point, that information regarding the inferred potential violation may be Changed to reflect a direct application of database data.

Since violation codes may be different depending on the agency that issues tickets and collects ticket penalties, violation codes data input into the unified database may include violation codes from various agencies and/or statutory codes as they appear when written into law. For example, in New York City, a parking ticket may state the Department of Finance Violation Code as "14," which means "General No Standing: Standing or parking where standing is not allowed by sign, street marking or; traffic control device," and state "In violation of NYC Traffic Rules, Section: 4-08(e) No Standing." Accordingly, available parking rules data, for example, Chapter 4 Section 4-08 of Title 34 of the Rules of NYC and also Violation Code data from the Department of Finance may be entered into the database. The central computing system may use these violation codes with the matching section codes and their respective meanings, which are stored in the unified database, to infer the time frame and distance frame to which the no standing rule applies as no standing is usually for 24 hours and may extend for a whole street block. If a user does not participate by reporting, then the system administrator may hire an employee to physically inspect the location and verify the distance frame. The processing apparatus may use this information to accurately alert the user based on the vehicle's distance or time frame. Though inferences might not be 100 percent accurate all the time, as there are sometimes exceptions to rules on a certain street between two similar locations, the combination of knowing the codes that underlie the reasons for getting a ticket in the first place and having a user rate the notification and the information allows for that potential inaccuracy to be accounted for. Tying a notification back to a user engagement panel may increase efficiency and accuracy, allowing the notification to be corrected, updated, and supplemented too.

An exemplary embodiment of the present invention may alert the user when the user is parking in or near a tow zone area which includes but is not limited to private parking only, permit only, temporary road repairs, access for emergency services, and driveways which cannot be blocked. Other situations may include handicapped parking, reserved parking, parking permit only, and any other parking spaces designated for special purposes, wherein special purposes parking locations may be reported by one or more users, interested individuals, private entities, and the system administrator who may also collect such information from informational sources. "No parking," "Tow away zone," "24 hours active driveway" etc. are usually indicated with lines, signs and/or words that state for example, "Tow Zone" or "Private Parking Only," Tow away zone information may include a time frame when parking is illegal at an identified location of the user and the user's vehicle; the distance to or from the tow away zone where parking is illegal; and information about private and public tow away zones, along with relevant information about towing companies and costs and penalties associated with the user's vehicle being towed away.

People who are authorized to manage such spaces subject to towing can register towing information, or a user can report this information, which may be used by the central computing system to notify other users who are not authorized to park in the space at any time. Important towing information includes but is not limited to location of the tow zone, towing company name and telephone number, penalty for parking in the tow zone, and other relevant contact information. Drivers who illegally park their vehicles in a tow zone may be alerted about the parking violations and penalty through a notification based on information saved in the unified database. If a user parks illegally and their vehicle has been towed, the user may check the parking location by pressing a button on the display of the computing device to show the towing information such as the phone number, towing penalties, and other contact information if it has been registered by the people who are authorized to manage or access such tow zone space. The user may use this information to easily call to find out where the vehicle has been towed. Both time and resources may be saved because a user is deterred from parking in the space if the user knows it is a tow zone and has information about the penalties. Tow zone areas may also be indicated on the map display through different colors to reflect that temporary parking is not allowed, for example, due to a temporary tow zone notice for road repairs. A user may upload images of the posted temporary tow zone signs when reporting the notice, and then the system may notify another user through a notification which is subject to positive and negative ratings.

The processing apparatus may be in communication with a central computing system to process the information reported from one or more users who enter such information and upload images of their ticket violations and to generate one or more applicable notifications with parking violation related data corresponding to the identified present location of the user and the user type of the user. While ticket information may be processed and used to create or update a notification, ticket reporting from one or more users is also connected to the ticket sharing user engagement panel. After receiving this ticket, the user can access the user-engagement panel to report the location of the violation. The user may identify the type of parking ticket to be reported from a menu of available pre-determined types. A multi-level menu system can be used to guide the user to a selection, which identifies the type of possible ticket type. The server receives the report and the user's geolocation and determines additional contextual information that may be provided by the user and/or the user's computing device from the stored user profile. The processing apparatus may also collect user supplemented information including, but not limited to, personal knowledge and/or ticket information with the time of the violation, the exact location as printed or written on the ticket, and the reasons for the violation, etc. A user may also be required to enter information such as photographs, videos, and written explanations to share their ideas on why the violation occurred in the form in connecting with the parking violation location.

There may usually be two types of tickets: either a handwritten or machine generated ticket from a law enforcement officer or a machine generated ticket from a street camera image. Different law enforcement agencies may also use different forms for ticket violations. Any user reported information may include the information such as location, time, reasons, and also any suggestions, advice and/or solutions the user can contribute in order to share knowledge to educate other users to avoid the same type of violation again. The person who receives the ticket may be in the best position to submit suggestions, advice and/or solutions based on personal experience The user may supplement reported information with photos of the location and any written explanations in addition to the photographs in the user engagement panel that are connected to the location of the violation. If the user takes a picture of the ticket to upload to the unified database, the application may allow the user to edit the image with an image editing function by covering, blurring, or redacting information and/or sharpening the image prior to uploading the picture. A user may cover or blur parts of the images with sensitive information, for example name, plate number, or vehicle identification number, etc. Using optical character recognition to sharpen blurry images increases the success rate for a computer to recognize the information in the image. As an alternative, the unified database may also allow a user to scan the parking violation citation by utilizing a camera with scanner software downloaded on a computing device.

Reported information may be subject to a review and/or ratings by the system administrator and also other users to ensure that credible information is being collected to provide a notification. Comments, suggestions, etc. may be listed in the user engagement panel according to ratings, and the ones with the highest number of positive ratings may be listed at the top, so other users can clearly view the postings to gain the best knowledge. The user may be allowed to report to the system administrator any potentially inaccurate information with applicable proof. The system administrator may be able to open a case where an employee and/or user may be sent to conduct an investigation of the purported inaccurate information to verify the quality of the information. A reward may be provided for the user who may have assisted in the investigation.

The central computing system may provide an informational and educational function, where it provides a notification that may give specific reasons and suggestions on how to avoid the same violation and displays the historical summary of the violation to persuade the user to not take a chance at parking in a location with parking violations and so the user may know about a violation in advance.

An exemplary embodiment of the present invention may utilize an incentive method since the unified database incorporates at least a method of crowdsourcing data from one or more users through means of a user engagement panel. Crowdsourcing relies on the participation of a large number of people who are incentivized for participation. Basically, this incentive method allows a user to post and share parking violation related data to gain positive ratings, a predetermined number of which may earn them one or more rewards. In this method, the user may be rewarded based upon the user's proactive effort to report ticket information with efficiency, helpfulness, and accuracy. When a user receives a ticket, the user has the option to dispute or pay the ticket before the deadline. The user may receive positive ratings after the ticket information is complete and submitted to the user engagement panel.

A reward may be issued to the first user who reports ticket information at a location that has no prior ticket history of parking violations in the unified database. The amount the user may receive may be the total amount stated on the user's ticket or an amount that is set by the system administrator according to the amount of positive ratings received for providing ticket information along with comments and recommendations on how to avoid parking violation citations. Through rewards, a user may incur no losses from ticket violations and may also educate others to better comply with RRLC by sharing ideas to avoid future parking ticket violations. The reward system may involve several steps. In order to be eligible, the user may be required to be the first user to fully report new ticket information in detail for that specific location, that did not have any prior ticket history by reporting the date; the time from the issued ticket with specific information on the reasons for the ticket; and giving beneficial suggestions, ideas, and/or advice on how to avoid the same violation. The first user who shares the full details of the ticket information and receives a certain number of ratings may receive a reward. However, other users may be allowed to enter ticket information if the ticket for the same location indicates different reasons or violations which may qualify for a reward. The application may allow a user to take a photo of the ticket, which may be redacted or sharpened before submission as described. Each location may allow for the submission of one original ticket report which may allow one user to gain a reward. However, the system administrator may change the type of reward and/or amount of reward to different users who report parking ticket information by descriptions in different circumstances. For example, a reward for the first user may pay double amount of the reward or give a gift as a monetary reward. Also a user who actively participates in supplying crowdsourced information may do so without expecting to be rewarded. In this case, the user may opt out of receiving rewards through settings in the user engagement panel, or may simply decline a reward when one is being offered.

Tickets issued by law enforcement officers may indicate a date which serves as the deadline for paying the ticket violation. An incentive to the user is rewarding efficient and useful reporting to help other users pay for their tickets through a reward system. Incentives are crucial to obtaining both an active participation from one or more users and also for obtaining accurate and truthful information. Active participation is important because statistical analysis depends upon a large group of data and it is important to continuously obtain real-time data of current situations.

For quality control purposes, an exemplary embodiment of the present invention may integrate a verification system. For rewards, the user engagement panel may track ratings, so that a user might only endorse one time for every ticket report. Additionally, the user may only rate the notification of potential parking violations, if the user has personally experienced and received such notification when a user's geolocation is indicated to be within a predetermined radius of the location with violations. Such a user who has received the notification based on their firsthand experience can either endorse (positive) or rebut (negative) when rating the notification. Allowing for the rating and verification system, the user engagement panel may ensure that the ratings are up to date. A notification is rated, and a notification that contains inaccurate information and is negatively rated can be flagged and corrected, and a notification that is rated highly can remain. In turn, a new notification based on new information may be rated in the future, which may lead to further rating in the future. For example, this may be the cycle that keeps the data in the database updated regarding any changes or inaccuracies.

According to an exemplary embodiment of the present invention, the process by which the unified database is kept current involves, in part, a user rating the notification that the user receives. Because a notification is based on data points that relate to parking information within the unified database, when a user rates the notification, he or she is also rating the data contained in the notification. Through those ratings, it can be determined if the data is accurate or applicable to a particular parking location. If the data turns out to not be accurate or applicable, it can be used to correct, update, and supplement parking violation related data in the unified database based on user feedback. If it turns out to be accurate and/or applicable, then the correctness of the data may be reinforced through the feedback. The notification that a user may receive may consist of information regarding a specific parking location. The notification may convey to the user that there are not currently any parking prohibitions in place that relate to the parking location, or it may inform the user about relevant rules or regulations that are currently in effect. The user can then rate that notification, either positively or negatively, e.g., whether it was correct or incorrect. The process can be illuminated through an example of a notification informing a user that there were no parking prohibitions in effect when in fact the user's parking location was subject to a temporary prohibition regarding street sweeping. In this case, the user may, on the user interface, rate the notification, e.g., provide a negative rating. A user may substantiate a negative rating by submitting proof that the notification was inaccurate. The user, in this example, may take a picture of the sign that announced when the street sweeping was in effect, or any other relevant signage. This feedback is collected along with the ratings, which may update the database to reflect the new user-submitted data. If the data that the user provides through this negative rating turns out to be accurate, it may be used to correct, update, and supplement the unified database. However, the data or information provided by negative ratings would have to be past a predetermined number to overturn a notification. If a negative rating and its corresponding information have not passed the predetermined number, the user's negative rating may be shown in the notification by including an indication that a small percentage of users have rated the notification negatively and/or as inaccurate. When those negative ratings do reach the predetermined number, the new information provided through those ratings may replace the existing relevant data in the unified database. This in turn updates the content of the notification that is issued. In the above street sweeping example, if the user is the first to indicate that there is a relevant street sweeping regulation, and the user engagement panel receives ten more negative ratings saying that the notification in effect is incorrect, supported with information similar or the same to the first user, then once there has been enough submissions or ratings, the unified database may be corrected, updated, and supplemented based on this corroborated information. How much is "enough" may be predetermined, such as 10, 25, 35 ratings or submissions, etc., or it could be based on the percentage of total ratings. For example, a 25%, 10%, or 1% negative rating threshold may trigger a data review. The predetermined number of ratings may also differ based on location. In a busy location such as Midtown Manhattan, the density of parking violations and the demand for specific parking locations may be higher than in more rural areas. In addition, there may be more users sharing or rating the parking violation related data. Therefore, these different locations may have different standards for predetermining a number. Regardless of location, once the information submitted reaches that predetermined number, it may be incorporated into the unified database. The user who is the first to provide corrective information may be provided with a monetary or non-monetary reward for being the first to contribute new and useful information that is incorporated into the unified database, which gives incentive to a user to provide accurate and timely information, therefore keeping the unified database current.

Ticket violations are legal documents and may be subject to disputes. When a user may want to dispute the ticket violation, the user engagement panel in connection with a specific location of a parking citation may be useful because other users may comment on their personal situations on whether a dispute is likely to be successful or meritless. Crowdsourced data may be collected within the user engagement panel, for parking violation related dispute information from one or more users in order to assist users with useful dispute information. This dispute information may also be useful for a user who encounters a law enforcement officer and can use this information to discuss and explain the situation to the law enforcement officer. The user may show the law enforcement officer that, in fact, other users who have received the specific parking ticket violation have disputed it in court and have won. The law enforcement officer, who is now informed of the situation, may or may not issue the ticket violation or may revoke the ticket violation as a result if the officer has the discretion to do so. This method may save a user money because if the dispute has merit, as reported by others, the user may win the case. If the dispute does not have merit, as reported by other users, then the user may decide to just pay the fine and not dispute the ticket. Information related to disputes may be used to inform other users of ticket dispute success probabilities. The system administrator may also hire professionals, who may specialize in parking ticket disputes, to assist in resolving dispute issues in the user engagement panel. The application may allow a user to check dispute success probabilities through pressing a button on the display that connects to the database of parking violation tickets received by other users. Accordingly, a user may be educated on how to use legal remedies with efficiency.

An exemplary embodiment of the present invention may also educate a user on the process of disputing tickets if a dispute is meritorious. It is often the case that a user is unsure whether to dispute, and how to dispute the ticket violation when they do. The user may utilize crowdsourced ticket dispute information from other users to find out whether a ticket has a good chance of being dismissed if disputed based on information submitted by other users. The dispute procedures may include information on the types of evidence that may be collected and submitted to the proper authority who adjudicates the dispute. The user may also be allowed to search and connect with third parties, such as lawyers who are experienced in disputing ticket violations, whereby the application may allow the user to email pictures and other types of documents to the third-party directly from the application. The user engagement panel functionality may also allow a user to share information on their hearing and results of their hearing for their tickets. Other users may use this information as a reference for fixture hearings since a user may be able to see other users who may have gotten the same type of ticket in the same location for the same reasons. This information may be collected to conduct analyses on locations that may have unusual ticketing activity to initiate guidelines to the user.

The application may alert the user to avoid the parking violation ticket by notifying the user through email, text message, phone call, phone alert, voice mail etc. automatically at the choice of the user who set this in advance in the settings. Functionalities, notably the user reporting function, may connect to third party APIs to provide voice-to-text capabilities. A user who utilize the voice-to-text function may record their voice by speaking their statements into the microphone which may be connected to the computing device, where statements may be converted to text. Accordingly, a user might not necessarily have to enter information manually and may submit information by recording their voice statements.

The geolocation of each individual user may be recorded while driving, along with the user's speed, in which a slow speed of 1-3 mph, for example, may be indicative of the intent to park within a certain radius of the intended destination as preset by the user. Based on the user's geolocation and speed, an inquiry may be sent which asks for example, "Parking?" If the user chooses "Yes" then any parking violations within a predetermined radius of a specific parking location may be identified, and the notification may be applicable to the user type of that user. To generate a notification, the processing apparatus may query different data sets within the unified database for example, any historical citation information currently available; RRLC applicable to the user type of that user, the user's present location, and present time; any administrative notices or temporary notices applicable to the user type of that user, present location, and present time etc. If the user does not respond to the alert after a certain time, for example, 3 seconds, then the inquiry may disappear automatically. The user may receive an inquiry for the parking intent, when the user's geolocation is within a predetermined proximity of the intended destination, which may be a certain number of feet as set by the user. The user may also set the number of notifications the user would like to receive; for example, a user may want to receive an inquiry or notification once, twice, or the user might not want to receive any notification, etc. If the user does not respond to the notification, the processing apparatus may stop sending the notification after it reaches the number of instances previously set by the user. After this, the user may press a button on the display if the user would like to view the potential parking violation notification information for the current location. Since a road map may be integrated in the database, if the vehicle slows down or stops in the middle of the road due to traffic or other reasons, or is outside the radius of the intended destination, the central computing system may recognize such location through the geolocation GPS coordinates and speed data, and may automatically know to not send a parking intent notification since parking is not allowed in the middle of the road because it may block the street. The notification may appear on the display of the computing device or may include the option for a voice alert. According to an embodiment herein, parking intent of the user is identified by determining and analyzing the current instantaneous speed, through the accelerometer, and the proximity to the intended destination, through the location identifier. When the user shows parking intent, the unified database may be checked for any potential parking violation citations applicable to the location depending on the time and day. When parking intent is identified, the notification that appears will be for parking violation related data found within a predetermined radius of the user with parking intent. The predetermined radius may be preset by the user to be a certain distance, because a user may prefer a radius of 500 feet of a destination whereas another user may prefer a predetermined radius of 1,000 feet. If a user does not preset this, there may be default settings for the predetermined radius, which may differ depending on the location. For example, a default setting for a predetermined radius may depend on the city in which a user is located.

An exemplary embodiment of the present invention may also connect with third party weather APIs to retrieve historical weather information for the specific location to predict future parking situations where weather may have an impact on parking violations based on indications of increased parking violations during certain weather conditions. During similar weather circumstances, a user of any parking restrictions which may apply in the location where the user may intend to park. For example, if the central computing system detects through a weather API and geolocation that the user intends to park in a location subject to any expected snowfall or floods, it may compare this information to the historical parking violation related data within the database to find out if there may be any weather-related parking restrictions and increasing number of parking violations in the location which may be applicable. The user may receive a notification when the weather forecast is similar to situations from historical data that reflect an increase in the number of violations for a certain area due to the same weather conditions. For example, the historical data for a certain location showed an increase in parking violations when there is snowfall. The historical data shows the increase in parking violations was a result of the snow covering up a fire hydrant, leading drivers to believe they can park in the location since they cannot see the fire hydrant. Accordingly, if there have been previous violations due to specific weather-related reasons, a user may be directed to find an alternative parking location to avoid potential parking violation citations.

An exemplary embodiment of the present invention can be integrated with in-dash systems to enable full function within a vehicle. This integration is not limited to in-dash systems and may also be integrated in the vehicle by original equipment manufacture or a third-party add-on equipment that may be mounted within a vehicle. The present invention uses direct integration of the disclosed parking space information system into the navigation and GPS in an onboard computer of original equipment manufactured vehicles. In such embodiments the disclosed architecture can be integrated directly into a vehicle's computer system.

When integrated into an in-dash navigation system, the vehicle's display may be used to show a parking notification in accordance with an exemplary embodiment of the present invention as described above. The in-dash integrated system embodiment can provide remote updates and communications to the user through the installed disclosed violation related information and parking violation avoidance application on the user's computing device to alert the user for example, when the parking time limit is approaching expiration, impending street cleaning or other temporary restrictions. When a user arrives at a parking spot, central computing system may receive the vehicle's location and may send a notification to a user's computing device to remind the user about the approaching parking meter expiration when applicable in addition to other relevant restrictions.

Integration may include utilization of vehicle equipment, for example speedometer, accelerometer, cameras, inertial sensor, gyroscope sensor, GPS sensor, and any other applicable equipment, etc. Utilization of this vehicle equipment may be used to obtain comprehensive real-time and historical activity information about the vehicle, for example its direction, speed, orientation and acceleration, etc. in order to issue an applicable notification to the user.

According to an exemplary embodiment of the present invention, a combination of hardware and software operates on an application of a computing device and a central computing system, such as a computer, generally with one or more connections to a wireless wide area network (WAN) (e.g., the Internet). The central computing system may be configured to communicate with network service coordinated through communication means.

An exemplary embodiment of the present invention may utilize pre-programmed features combined based on certain protocols or methods of integration of basic components, such as servers, unified databases, mobile end applications, web portals, network settings, etc., where the applications could be applications written for ANDROID, a mobile platform developed by Google and the Open Handset Alliance, IOS, a mobile platform developed by Apple, Inc., WINDOWS PHONE, a mobile platform developed by Microsoft Corporation, etc.

In order to dynamically update the records, an exemplary embodiment of the present invention may use a unified database or a set of unified databases (or data storage media). The unified database may contain several data categories or groupings. The unified database contains information for both historical and real-time records, where the real time and historical sections of the unified database may be independent or synchronized in order to retrieve information from both sections at the same time. The unified database may also contain records regarding a user and records from specific user engagement panels. This data could include rules and administrative data as well as user data. Historical data is kept track of partly by assigning tracking number or service ID number that would be assigned to ticketing or related information to help refer back to it if it comes into question. Information that could be held within this identification may be information, such as the reason a ticket may have been issued, who or what agency issued it and where it took place, such as address specific information including house or building number, zip code, borough, city or state, how much the fine is and how the payment for the service took place if it did.

It is to be understood by one skilled in the art that the unified database updates and syncs dynamically whenever there are changes or updates in data blocks; the server and unified database may dynamically update the data to reflect the latest changes. Any backup unified database related to the unified database may also change accordingly to also reflect the latest changes. In an exemplary embodiment of the present invention, such information may be organized or structured in a manner allowing for effective sorting and retrieval. In an exemplary embodiment of the present invention, the information may be stored in a non-relational or unstructured manner. One of ordinary skill in the art would appreciate that there are numerous methods for providing, storing and organizing data in a unified database or other data storage media. Additionally, there may be at least one backup unified database that may backup the primary unified database frequently in case of data loss in the primary unified database. While referenced as a "unified database," one of ordinary skill in the art would appreciate that in practice this could be implemented in numerous manners, including but not limited to a data storage medium, whether structured or unstructured, relational or otherwise. One of ordinary skill in the art would also appreciate that there are numerous methods of providing unified databases and data storage media for the organization and retrieval of specific information, contemplated for use with any appropriate unified database or storage means.

According to an exemplary embodiment of the present invention, the comprehensive unified database may store administrative data and other information. The administrative data includes any information or data which is part of the application or other access means, comprising system data such as contact and FAQ information, registration details regarding a user, for instance, billing or identification information or other relevant information relating to administering the service, for example how long the user has been registered or the frequency of use According to an exemplary embodiment of the present invention, additional data which may be input into the unified database includes, but is not limited to, locations where a user traveled to, other transaction data and details, historical data, and user engagement panel contributions from a user.

According to an exemplary embodiment of the present invention, a user may access historical records, may explore the unified database, and may retrieve related data from a search function or other means. Each time an input or request from a user who wants to see related information is made, a safe access channel with unified database(s) may be opened and the central computing system may send out the query sentences through the access channel to a unified database management module. If it is a relational unified database, then the data tables may have one kind of relationships, such as one-to-many relationships, many-to-many relationships and one-to-one relationships with other data table(s). Based on the relationships between data tables, the unified database(s) management module follows the query sentences and finds the specific data table(s) by using ID(s), table names and columns names of the tables with or without joining two or more data tables together. If it is a non-relational unified database, instead of data tables, the data may be stored in key-value pairs, then the unified database management module follows the query sentences and finds the specific data by using keys that query sentences provides. Whether a relational or non-relational unified database is used, after the unified database(s) management module retrieves the targeted data, then the central computing system may send the search result back to the server through the secured access channel. Then the secured channel is closed until the next time it needs to be opened. The relevant data that has been organized within the unified database may then be retrieved and displayed.

A geographical information system (GIS) may be used in concert with the unified database for capturing, displaying, storing, manipulating, and analyzing geographic information. To fulfill certain query operations, a GIS can extract and analyze data from the unified database, or data may be stored within the database management system (DBMS) of a GIS. A GIS may be used to visualize the data within the unified database. For example, in New York City, data sources such as MapPLUTO from NYC Open Data and Open Street Map contain geodetic base maps. Then, an inventory of other data points such as meter parking, locations of bus stop, commercial vehicle parking, taxi lanes, bus lanes, parking garages, street parking locations, parking restrictions, locations of fire hydrants, etc., can be gathered and applied through a GIS and visualized on a base map. This provides a way to usefully sort, access, and view the data.

Components of GIS: GIS consists of some important components to carry out its fundamental functions properly. The components of a GIS are as follows: hardware, which entails a central computer or any secondary device attached to it that enables the GIS to be functional; software: algorithms written using executable programming languages to store, analyze, and display geographical data and information; and data: any information to be analyzed, such as parking locations, maps, etc. In addition, a GIS may have to be maintained by a technician or other qualified personnel who has knowledge of the precise upkeep procedures, especially those concerned with adjusting system functions to an organization's need for a GIS. Different classes or models of a GIS may also be used for different applications. For example, a GIS such as a field model may be necessary to analyze data which changes over continuous areas. Discrete models may be used to analyze data which relates to points in a two-dimensional space. Finally, network models may be used to analyze two points connected by a series of points, such as points along a highway or a railroad.

According to an exemplary embodiment of the present invention, data is cross platform and can be accessed through different computing devices, such as web portal and/or applications, at the same time where desired. The different components within the computing device, which may be in many different forms such as tablet computers, cellular devices, smartphones, laptop computers, personal computers (PCs), in-vehicle navigation, and/or servers, or any other communication enabled devices may interact and communicate to share information. A user may use a computing device to access modules provided to the user through an application on the user's computing device.

The administration may also be handled through another module different from the one used by a user. In such a case, a user would not need the same features as a system administrator. One of ordinary skill in the art would appreciate the many different forms and functions of computing devices and understand that the exemplary embodiment of the present invention could be carried out with any, and also understand that the different types of user demand different functionalities.

According to an exemplary embodiment of the present invention, the user may communicate, for example, using any approach for communicating data over one or more networks or to one or more peripheral devices connected a computing device. Communications approaches may include, but are not limited to, circuitry and control systems for providing wireless connections, wired connections, cellular connections, data port connections, Bluetooth connections, or any combination thereof. One of ordinary skill in the art would appreciate that there are numerous approaches for communications that may be utilized.

According to an exemplary embodiment of the present invention, a user module with which a user interacts is dynamic and may be adjusted according to specific location. The user module may be connected through the server, for instance, through bi-directional wireless communication configured to show location data on the electronic map display and other data as input from a user. Displayed features may be specific to the location or region that the computing device is located in, so that region-specific information may be provided on the display interface.

An exemplary embodiment of the present invention may also adjust user module features, including the content displayed as part of a user interface features, based on other user selections and preferences. An application, a map component, a map database, and a location identifier, such as, for example, a GPS module or other circuitry for providing LBS data may be integrated for certain location identification functions. The GPS determines the location of the computing devices in different ways, for example through receiving location-based resources. One of ordinary skill in the art would appreciate that there are numerous approaches for providing location identification and location based services. A GPS enabled system or device allows the tracking components to identify the location of a user. According to an exemplary embodiment of the present invention, the user's current location can be determined by a location identifier. The location identifier can determine the location of the computing device in different ways. In one example, the location identifier can be instantiated through processing of received GPS data from location-based or geo-aware resources of the computing device. In addition, the location identifier can also receive UPS data from other applications or programs that operate on the computing device. For example, a computing device may communicate with one or more other applications using one or more APIs. The application can use the location information to cause a user interface component to configure a user interface framework based on the location information.

The region may be identified by a zip code or a city name or a metropolitan area name in which the computing device is currently located. Region-specific information about the parking related information may be provided in part. Preferences or limitations which are locationally based depend in part on GPS-enabled devices.

According to an exemplary embodiment of the present invention, the components can combine to provide user module features that are specific to user selections and user locations, and/or real-time conditions to enable a user to receive parking violation related information. For instance, the application can correspond to a program that is downloaded onto a smartphone or other portable computer device such as a tablet computer or personal digital assistant (PDA). A user can download and install the application on a computing device and register the computing device.

According to an exemplary embodiment of the present invention, user interfaces may include, but are not limited to, a homepage user interface, a user engagement panel that is used for one or more users to share ideas about avoiding parking violation citations, a summary interface, a location user interface, a database access interface, or a combination of any of the features described. One of ordinary skill in the art would appreciate that there are numerous user interfaces that could be utilized, and are contemplated for use with any appropriate user interface.

According to an exemplary embodiment of the present invention, the application can retrieve a user's information and other data that is stored in the unified database. In some implementations, the unified database can be stored remotely and user information can be retrieved from the unified database(s). The application can use the data stored in the unified database to identify previous locations with parking violation related data.

An exemplary embodiment of the present invention, as described herein, is not limited to applications involving conventional computer programs or programmable apparatuses that run them. It is contemplated, for example, that embodiments of the invention could include an optical computer, quantum computer, analog computer, or the like. Each element in flowchart illustrations may depict a step, or group of steps, of a computer-implemented method. Further, each step may contain one or more sub-steps. For the purpose of illustration, these steps (as well as any and all other steps identified and described above) are presented in order. It may be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context. The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it may now be appreciated that elements of the block diagrams and flowchart illustrations support combinations of elements for performing the specified functions, combinations of steps for performing the specified functions, program instruction media for performing the specified functions, and so on, whether the steps are performed automatically or not.

It may be appreciated that computer program instructions may include computer executable code. A variety of languages for expressing computer program instructions are possible, including without limitation C, C++, Java, JavaScript, Python, assembly language, Lisp, and so on. Such languages may include assembly languages, hardware description languages, unified database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more threads. The one or more threads can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing or the like. Therefore, embodiments that execute or process computer program instructions, computer-executable code, or the like can suitably act upon the instructions or code in any and all of the ways just described.

The invention may be described in the general context of computer-executable instructions, such as program modules, being executed by a computer. Generally, program modules include routines, programs, objects, components, data structures, etc., that perform particular tasks or implement particular data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system. It is appreciated that any of the software components of the present invention may, if desired, be implemented in ROM (read-only memory) form. The software components may, generally, be implemented in hardware, if desired, using conventional techniques.

Detailed description of the figures herein with the figures are supplemental for further detailed description of the invention, to explain the invention for better understanding. Accordingly, the following descriptions and figures are to be regarded as illustrative in nature and not restrictive.

An exemplary embodiment of the present invention may be used by members of the general public and/or computer systems which include but is not limited to: professionals, civilians, vehicles, websites, robots, in-vehicle systems, Global Positioning Satellites (GPS), and/or other systems. It is also intended that the present invention may be used not only within an application of a computing device, which may include primarily of smartphones, tablet computers, laptop computers, in-dash vehicle systems, etc., but may also be enlarged to encompass other systems or services which may process, utilize, and display the parking violation-related data, for example, contributions to the field of information services for online mapping companies and GPS manufacturers, smart phone or mobile device manufacturers, wireless service providers, application creators and developers, and mobile operating system developers and distributors, automated vehicle systems that do not require a physical driver in the vehicle etc.

Features of an exemplary embodiment of the present invention may provide a user with one or more visual and/or audio notifications. These one or more notifications may be provided on a user's in-vehicle navigation system, or they may be provided on a separate computing device, such as a smartphone or tablet through wired or wireless connection. Any feature may integrate with a platform or application program interface (API) to provide features which cannot be implemented on certain devices. In cases where vehicles already have an in-vehicle navigation system, parking violation related data may be provided to an information processing center that will process the data to be used. After the data is processed, it may go through a sub-system for information provisioning, and then be delivered to a user's in-vehicle navigation system. In vehicles that do not have an in-vehicle navigation system, parking violation related data may be integrated into one or more computing devices, which may be GPS enabled.

In the description of the figures below, it is understood that the details described above may be combined with, or may be used in place of similar attributes described below and that the figures are used only to illustrate a particular exemplary embodiment the present invention. It is to be understood, that for the purpose of providing simplified figures that are easy to understand, many of the details above have been omitted from the figures, however, it is contemplated that the details described above may be incorporated into the approach of the description below in any feasible manner.

Exemplary embodiments described herein are illustrative, and many variations can be introduced without departing from the spirit of the disclosure. For example, elements and/or features of different exemplary embodiments may be combined with each other and/or substituted for each other within the scope of this disclosure.

FIG. 1A is schematic diagram illustrating a system for using data from the unified database to alert drivers of parking violation occurrences in accordance with an exemplary embodiment of the present invention. The central computing system 100 may be the primary computing entity for performing the method described herein. The central computing system 100 may be deployed on the operative server 101, and in turn the central computing system 100 allows the operative server 101 to interactively communicate with other implements. The operative server 101 may be instantiated as one or more server computers and/or virtual machines that may work together to determine when drivers warrant a notification, and to provide the drivers with the notification, when warranted. The operative server 101 may accomplish this by accessing parking violation related data from data sets in the unified database 102, through the communicative means of the central computing system 100, periodically accessing the data sets in the unified database 102. Alternatively, these tasks may be done by the central computing system 100, which may access the data set of historical and real-time parking related violations in the unified database 102 using specific APIs, by subscription, or by being pushed this data as it is made available. The central computing system 100 may also source parking violation related data from one or more users and/or other entities. The central computing system 100 may parse the historical and real-time parking violation related data to understand its contents in a standardized and unambiguous manner. The central computing system 100 may generate a separate notification for a user of commercial and non-commercial vehicles as well as a separate notification based on type of vehicle and type of vehicle plate.

The user who provides the parking violation related data may, in addition to providing the data, access the central computing system 100 to pay parking violation fines. The central computing system 100 may connect to a ticket payment API 107 to facilitate this payment, where such a ticket payment API 107 is provided by the ticket issuing entity. A user may make use of the parking violation related data in the unified database as they drive in their vehicles 105 by interacting with the central computing system 100 via a computing device 106, such as a mobile device that is carried by the driver or an in-vehicle navigation unit installed in the vehicle 105. The computing device 106 may communicate with a network of communications base stations 104 and may interact with the central computing system. 100 via the Internet or other wireless connection 103.

FIG. 1B is a diagram illustrating a unified database in accordance with an exemplary embodiment of the present invention. Data sets are categorized according to non-commercial vehicle data 108 and commercial vehicle data 113 in the unified database 102. Non-commercial vehicle data set 108 includes non-commercial vehicle historical parking violation citations data 109, non-commercial vehicle real-time parking violation citations data 110, non-commercial vehicle parking rules and abbreviations data 111, and other non-commercial vehicle relevant data 112, such as types of vehicles, types of vehicles' plates and other data related to non-commercial vehicles. Commercial vehicle data set 113 applies to commercial vehicles only, which includes commercial vehicle historical parking violation citation data 114, commercial vehicle real-time parking violation citations data 115, commercial vehicle parking rules and abbreviations data 116, and other commercial vehicle relevant data, which may include types of vehicles, types of vehicles' plates and other data related to commercial vehicles 117. Data stored in user information data set 118 may include data such as type of the vehicle, type of vehicle plate, etc. The user information data set 118 may also be used to store user profiles, settings, preferences, user-input reliability to prevent system abuse.

Once the parking violation related data in the unified database is standardized and made unambiguous, the central computing system 100 may interpret that parking violation related data from the unified database 102 to understand a set of rules that appears to govern the enforcement of parking violations in a specific area. These rules may be mathematical functions that take location, day and time data as input, and as output provide an indication as to whether there may be a parking violation associated with the provided location, day, and time. These rules may be stored in a parking rules and abbreviations data sets for non-commercial vehicles 111 and commercial vehicles 116, where various parking related abbreviations and jargon particular to certain sources are utilized. The non-commercial vehicle data set 108 and the commercial vehicle data set 113 may be retrieved to generate the corresponding notification to the user. The parking rules and abbreviations data set for non-commercial vehicles 111 and commercial vehicles 116 may be retrieved to help standardize parking violation related data. A violation codes data set 119 may store violation codes and violation statutory codes used by law enforcement/authorities and their corresponding definitions.

The unified database 102 may also include weather-related data to connect with locations containing violation data. Historical weather data 120 may connect to historical citation data to find existing information about the correlation between a certain weather occurrences and parking violations. For example, during snow emergencies, designated legal parking locations may be illegal due to emergency services necessary to remove snow, etc. Historical weather data 120 may connect with non-commercial vehicle historical parking violation citation data 109 and commercial vehicle historical parking violation citation data 114 to obtain correlation information, which may be used with real-time weather data 121 to determine if a notification is to be sent to a user whose current location indicates that the user may be subject to weather-related parking advisories. Additionally, all data and information related to the user engagement panel is stored within user-engagement panel related data 122 comprising redesign of parking signage data as well as other parking signage related data 123 which may include translations or redesigns of the signage, data regarding the parking violation related-data contributed 124 by a user which was not in the unified database 102 suggestions on avoiding parking violation citations 125, advice on disputing a parking violations citation 126, as well as rating data regarding all the data submitted to the panel 127 that relates to all data or information and the ratings they have received within the user engagement panel data 122. Other data 128 relevant to providing an effective notification such as geographic data may also be input into the unified database 102.

Figure 2:
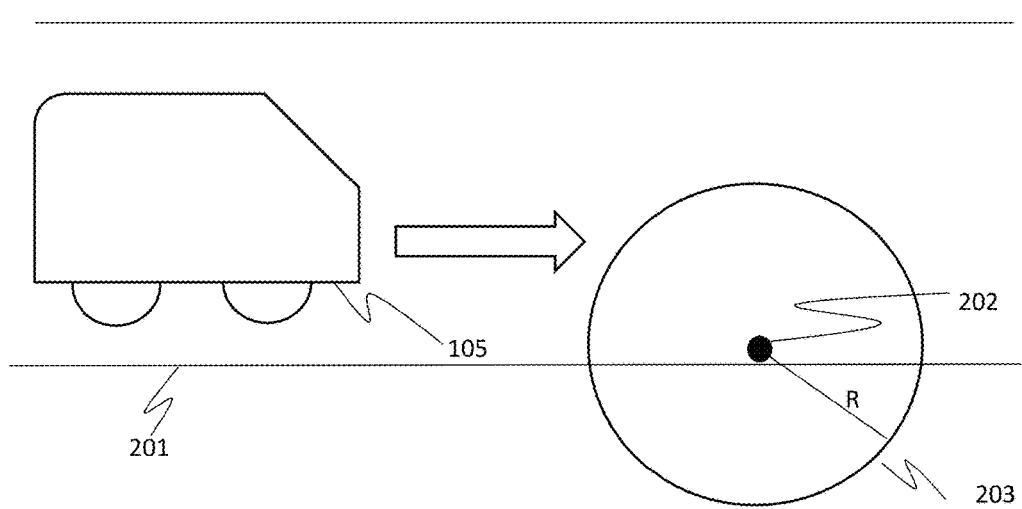
FIG. 2 is a schematic diagram illustrating an approach for alerting a driver in accordance with an exemplary embodiment of the present invention.

FIG. 2 is a schematic diagram illustrating an approach for alerting a driver in accordance with an exemplary embodiment of the present invention. The central computing system 100 may determine when the driver of vehicle 105 shows parking intent through identifying the vehicle's speed and location. Then the central computing system 100 may provide the driver with a notification of potential parking violations when the vehicle 105 is within the predetermined radius R 203 of a location, where the parking violation association has been made for geolocation 202 with previous parking violation related data and parking rules stored in the unified database 102. As depicted, the vehicle 105 may be traveling on a particular street 201. When the central computing system 100 detects parking intent by identifying the current speed and location of the vehicle 105, then central computing system 100 may determine from the parking violation related data and parking rules data stored in the unified database 102 if that location is associated with parking violations for the present time and day and the user type that the user belongs to. If it is so associated, any intent to park within this predetermined radius 203 may thereby generate a notification to the driver of the vehicle 105 from the computing system 100.

Figure 3A:
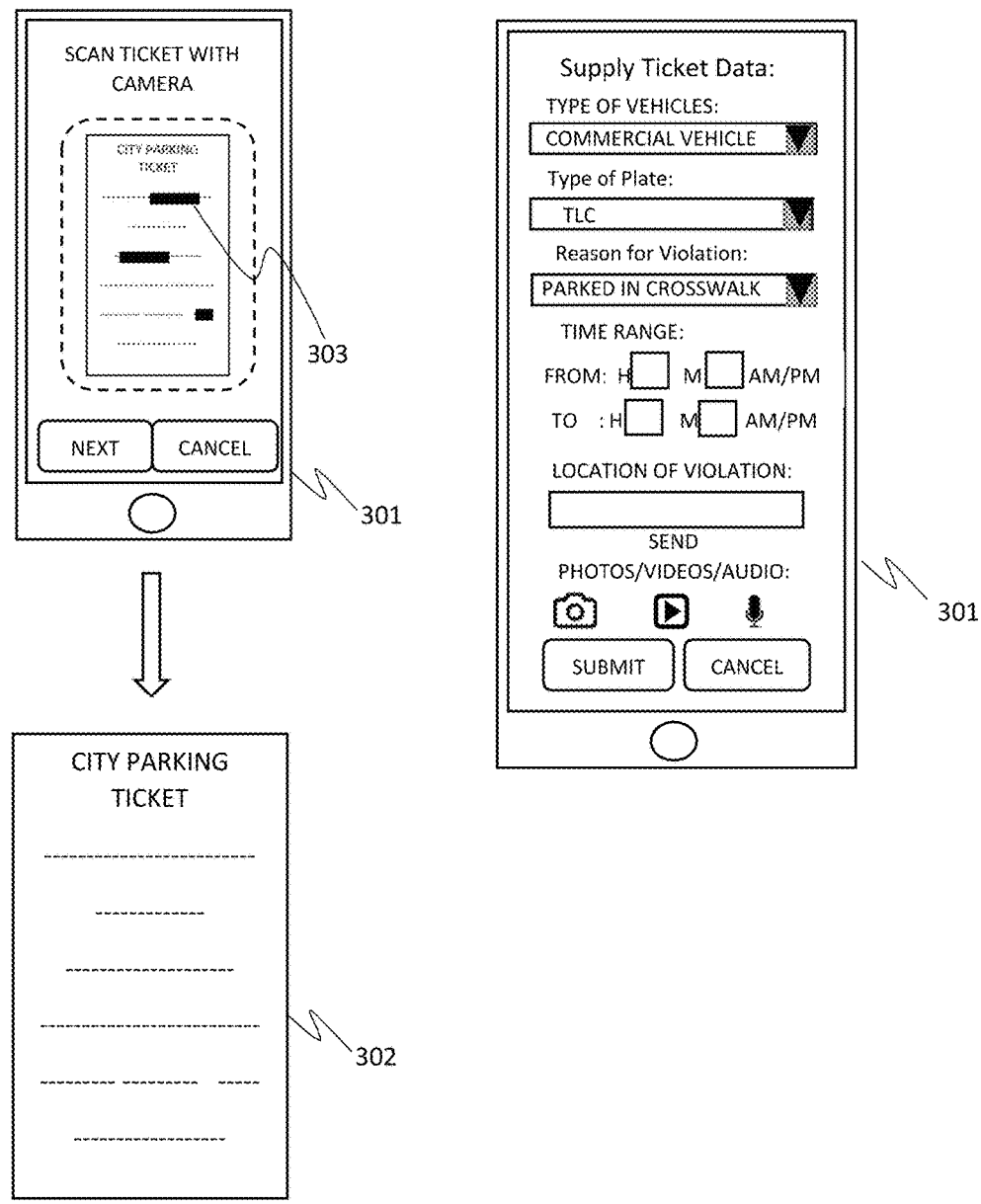
FIG. 3A is a schematic diagram illustrating a user's interaction with the central computing system using a computing device when a user reports a parking ticket in accordance with an exemplary embodiment of the present invention.

FIG. 3A is a schematic diagram illustrating a user's interaction with the central computing system using a mobile device when a user reports a parking ticket in accordance with an exemplary embodiment of the present invention. For the purposes of this illustration, the computing device 106 is depicted as a mobile device 301 such as a smartphone; however, it is to be understood that the computing device 106 is not so limited, and it may be a vehicle integrated information/entertainment unit or any other computer device or communications module.

When a user is issued a citation 302 for a parking violation, the user may use the mobile device 301 such as a smartphone to take a picture of the citation 302. As the citation 302 may include sensitive information such as the vehicle identification number (VIN) and other personal data, such as name, residential address, etc., the sensitive information may be redacted 303 either automatically by the mobile device 301 or manually by the user. Alternatively, the user may input the citation 302 information manually into the mobile device 301, for example, by selecting from various drop-down menus and/or by entering it, and other information into free text fields. The user may also use the mobile device 301 to choose type of vehicle or type of vehicle plate, provide a photograph, a video and/or an audio message, which may be particularly useful when the user is driving. As described above, the drivers may receive a notification when parking.

Figure 3B:
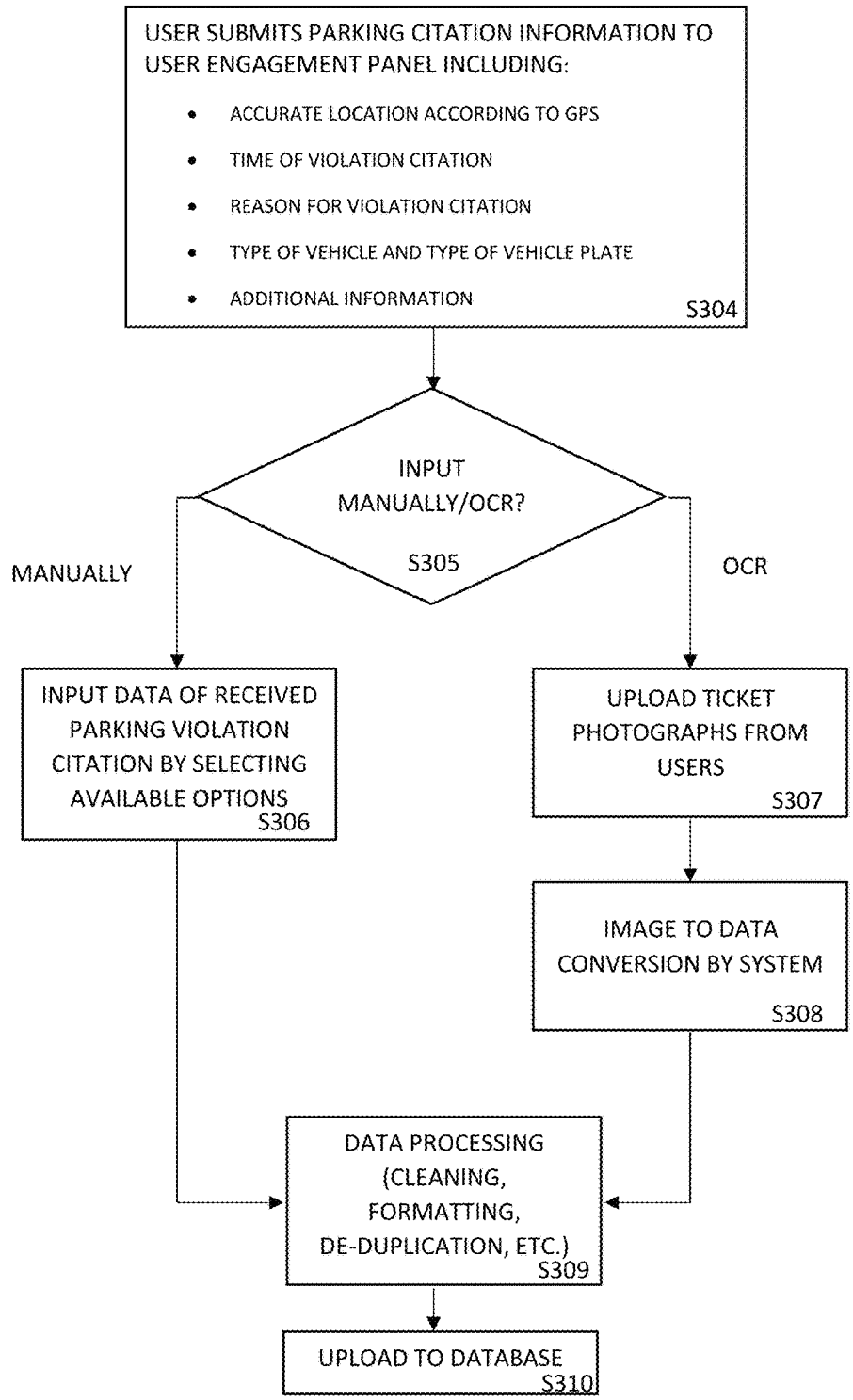
FIG. 3B is a flowchart illustrating how the parking ticket information reported by the user is recognized, processed and uploaded to the system in accordance with an exemplary embodiment of the present invention.

FIG. 3B is a flowchart illustrating how the parking ticket information reported from the user is recognized, processed, and uploaded to the system in accordance with an exemplary embodiment of the present invention. A user may provide parking citation information to the user engagement panel S304 including but not limited to accurate location according to GPS, time of receiving violation citation, reason for receiving violation citation, type of vehicle and type of vehicle plate, and any other additional relevant information, etc. Parking citation information may be input manually by the user, or the system may perform optical character recognition (OCR) S305 to obtain the information. Where input is manual, the user may input data of received parking violation citation by selecting available options S306. Once all options are selected and other related information has been filled in, the data may be processed S309 within the system through cleaning, formatting, and de-duplicating, etc. When complete, it may be uploaded to the unified database S310.

Where input is by OCR, a user may upload a parking violation citation photograph S307, which may be converted to textual data S308 in accordance with OCR techniques by an image processor to be processed S309 by cleaning, formatting, and de-duplicating, etc. the data. Once the data is fully processed, it may be uploaded to database S310. For example, there may be a type of violation that states "Taxi parked in an area only for commercial trucks for loading/unloading goods," The system may recognize the ticket and upload the data to the database with indicators that mark the ticket as a ticket only issued to non-truck vehicles.

Figure 4A:
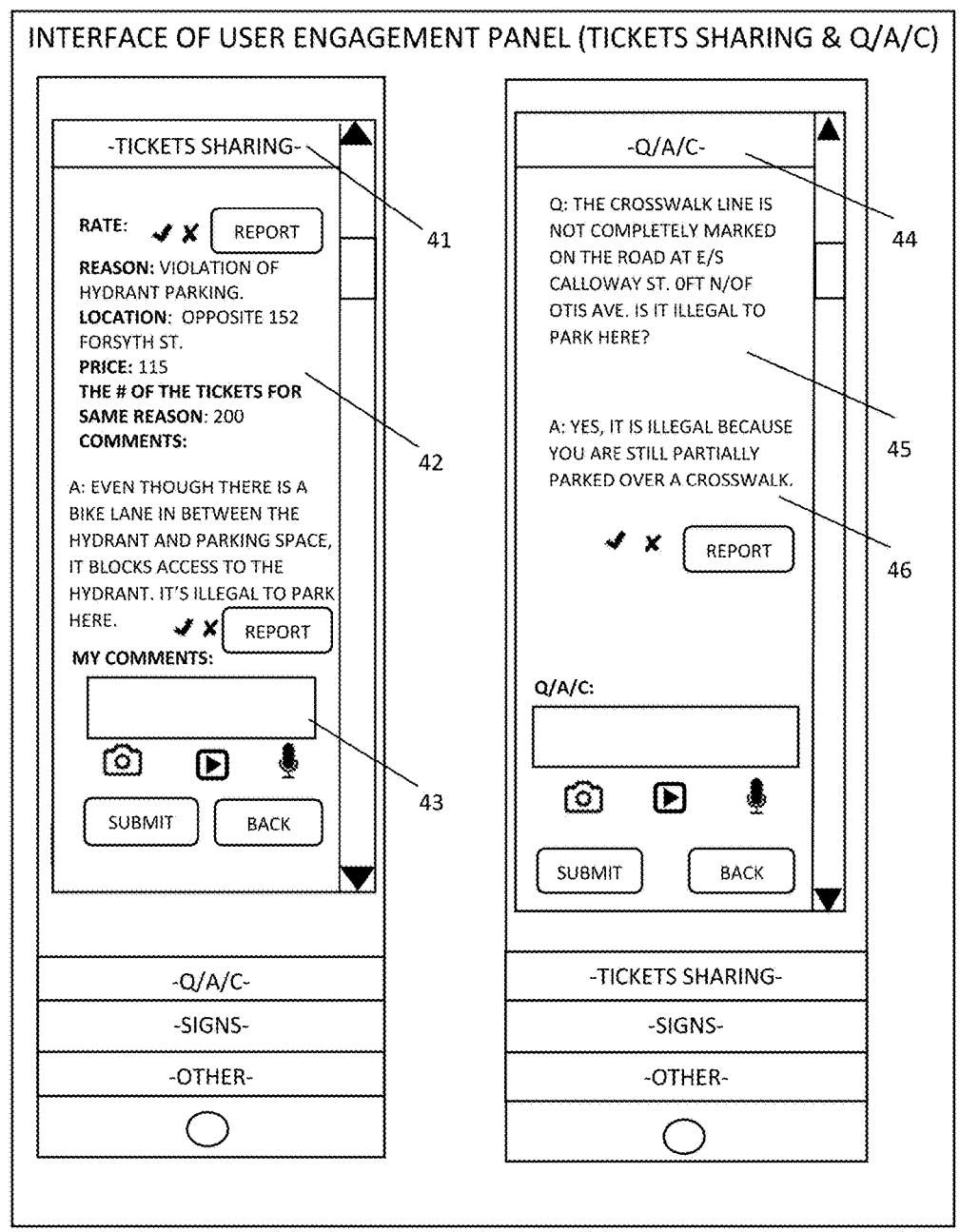
FIG. 4A is a diagram illustrating a user-interface engagement panel (Ticket Sharing & Q/A/C) based on a specific location in accordance with an exemplary embodiment of the present invention.

FIG. 4A is a diagram illustrating a user-interface engagement panel (Ticket Sharing & Q/A/C) based on a specific location in accordance with an exemplary embodiment of the present invention. When a user accesses the user engagement panel within the system of the mobile application, the user may have several panels within the user engagement panel to choose from, such as Tickets Sharing 41 and Questions. Answers and Comments 44. A user may rate or report within the user engagement panel, comment, view reasons, location of the violation, ticket penalty amounts, the number of tickets previously issued for the location 42. A user may also add their own comment 43 to the user engagement panel post while also submitting pictures, videos, voice recordings, etc. A user may also choose and submit questions 45, answers 46, and comments in the Questions, Answers and Comments 44 panel.

Figure 4B:
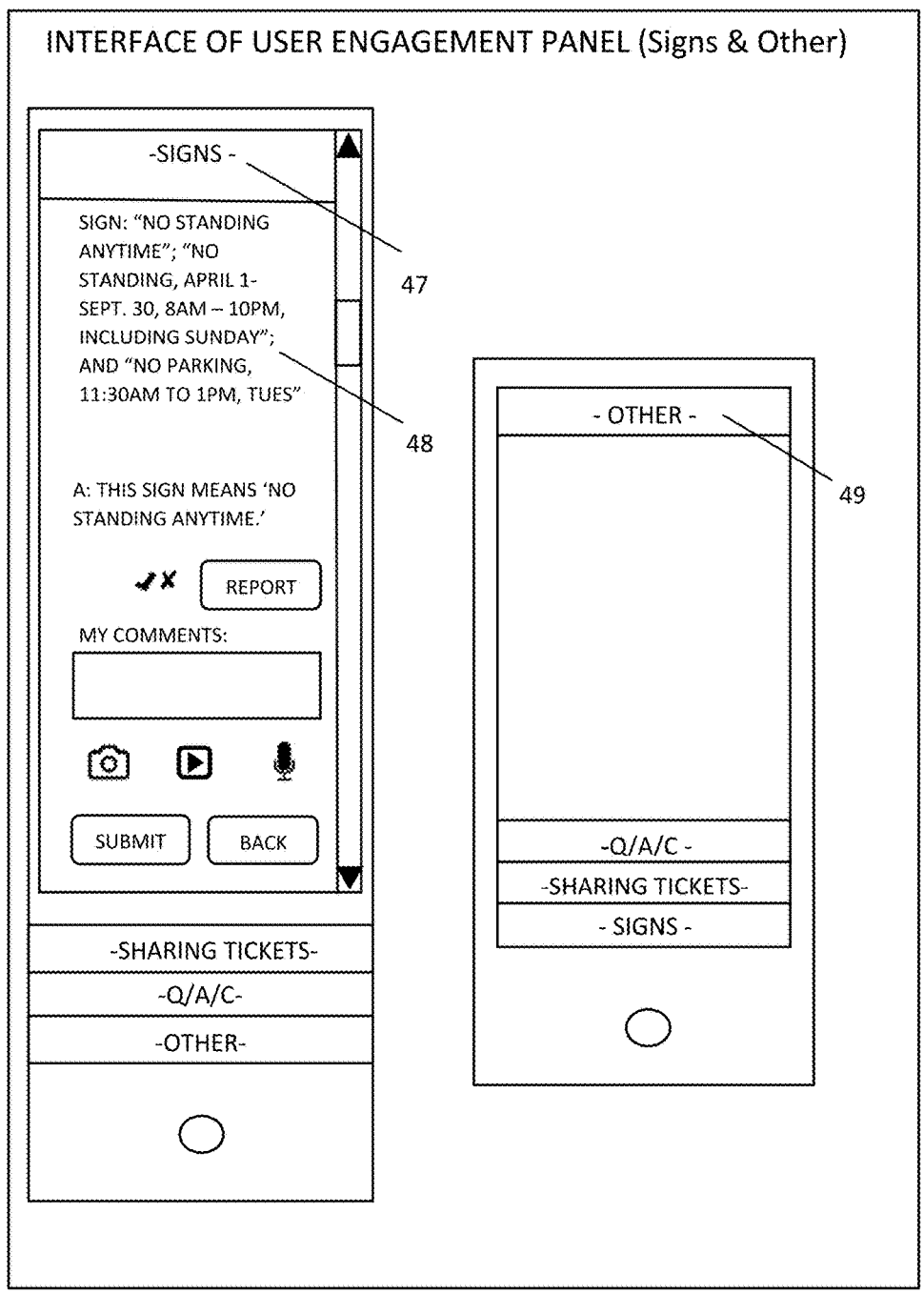
FIG. 4B is a diagram illustrating a user-interface engagement panel (Signs & Other) based on a specific location in accordance with an exemplary embodiment of the present invention.

FIG. 4B is a diagram illustrating a user-interface engagement panel (Signs & Other) based on a specific location in accordance with an exemplary embodiment of the present invention. When a user accesses the user engagement panel within the system of the mobile application, the user may have several panels within user engagement panel to choose from, such as Signs 47 and Other 49 not included in the above, if any. The Signs panel 47 allows a user to view the content present on parking signage 48 reported by a user and comment from other users regarding their interpretations of the signs. All comments or answers within the user engagement panel are subject to ratings. The comments or answers with the most positive ratings may be displayed at the top of the list. All comments and answers may be reported by one or more users and the administrator can hire employees experienced in traffic laws to help users resolve their concerns and provide professional answers. The user engagement panel may include Other 49 panel as determined by the administrator of the system.

Figure 5:
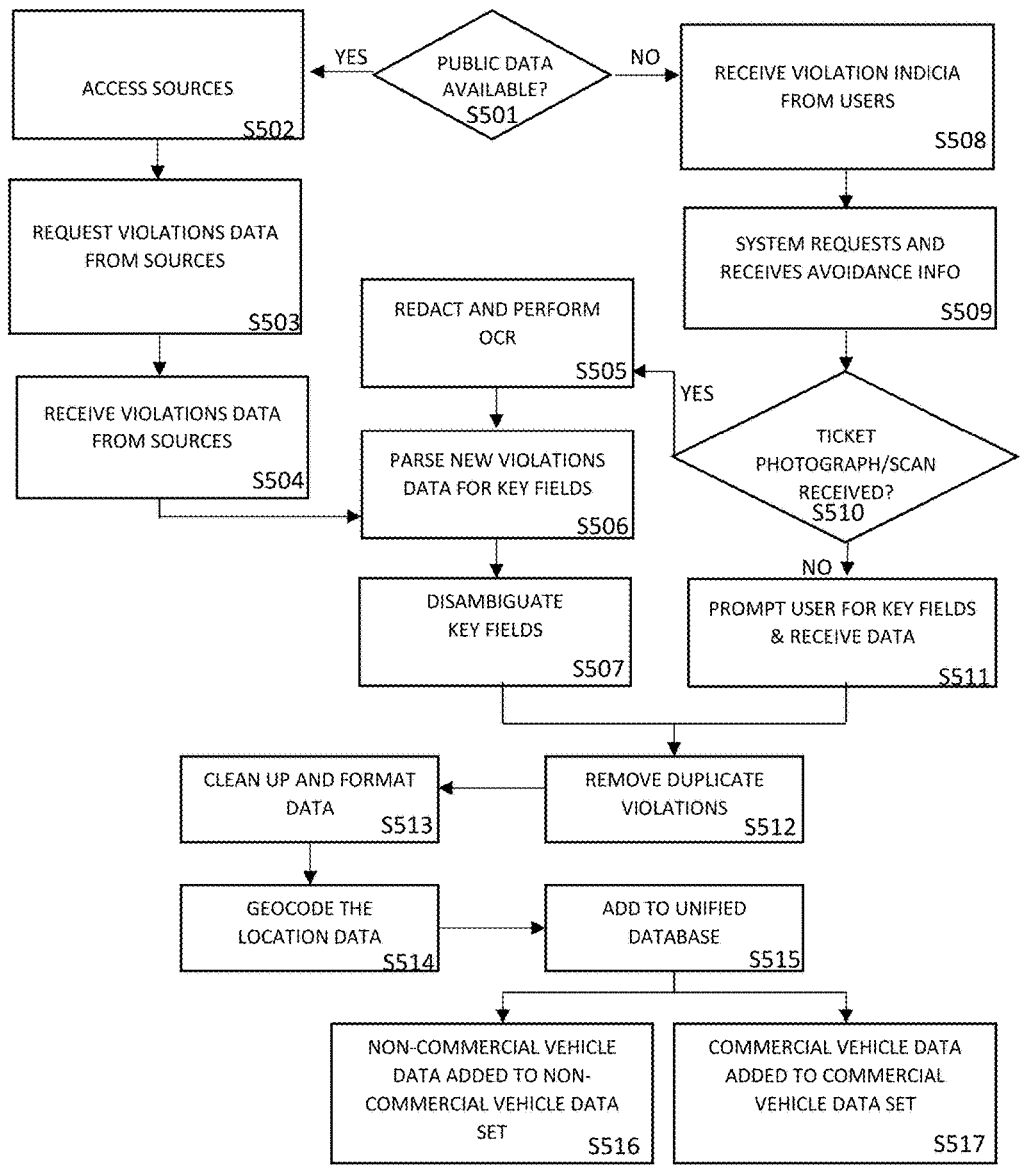
FIG. 5 is a flowchart illustrating an approach for processing parking violation related data in the unified database in accordance with an exemplary embodiment of the present invention.

FIG. 5 is a flowchart illustrating an approach for processing parking violation related data based on historical parking violation related data and real-time parking violation related data in accordance with an exemplary embodiment of the present invention. As discussed above, information relating to parking violations may come from at least two sources: historical parking violation related data set for non-commercial vehicles 109 and commercial vehicles 114 and real-time parking violation related data set for non-commercial vehicles 110 and commercial vehicles 115. The first determination that must be made is whether there is public data available S501. If so, sources may be accessed S502. These sources may be government or other media sources; any source that makes parking violation related data publicly accessible may be accessed. This access may be automatic and periodic. Once access has been established, violations data may be requested from websites and additional sources S503, and the requested data may then be received from the websites and additional sources S504. As this data may be in a form that is dictated by the particular source, the received violations data may be parsed for key fields S506, and the key fields are disambiguated S507.

As described above, parking violation related data may originate from private data. Thus, if there is no data publicly available from a public agency or posted in a location accessible publicly such as a published website, then an indicia of a violation may be received from a user S508. This indicia informs the system that the user has received a citation for a parking violation, and thus the process for collecting citation data may begin. During this process, the system may request the pertinent citation data from the user, as described above, as well as suggestions on how to avoid a citation S509. Next, it is determined if a photograph or scan of the citation is received S510. If this photograph or scan is received, optical character recognition (OCR) may be performed on the photograph image, which may have been redacted S505. Once OCR has been performed, the OCR text may be parsed for key fields S506. After the parsing of either the OCR data or the municipal data, key fields may be disambiguated S507. It may be understood that in writing the citations, the same location may be described in many different ways. For example, the parking space may be referred to by the address that it is in front of, or, in some cases, across from. This address may also be provided in many different ways. For example, a single street may be written as "sixth ave," "6th ave," "Avenue of the Americas," etc. Disambiguation therefore converts all data into a single format, for example, a location may be converted into latitude/longitude coordinates so that there is no ambiguity. Disambiguation may also be used to standardize violation names, for example, with reference to the abbreviations.

However, where the user does not provide a photograph or scanned image of the citation, the user may be prompted to fill in the key fields with pertinent data S511, for example, in an unambiguous way such as by selecting from various options or manually typing into free text fields; disambiguation might not be necessary in this case. In either event, all the collected data may have duplicate violations removed S512, cleaned and formatted S513, with locations geocoded S514 to ensure that the same instance of a citation is not counted twice. This may be done, for example, with reference to a citation number that is specific to the issuing agency. Once the data is cleaned and formatted, it may be added to the violations data set in the unified database S515.

If the new violation data pertains to a non-commercial vehicle, the data may be stored in noncommercial vehicle data set S516. If the new violation data pertains to a commercial vehicle, the data may be stored in commercial vehicle data set S517. Also, new violation data may be sub-grouped by type of vehicle and type of vehicle plate. Data may include time, day, and location-linked rules for commercial and non-commercial vehicles for the system to determine parking rules.

Figure 6:
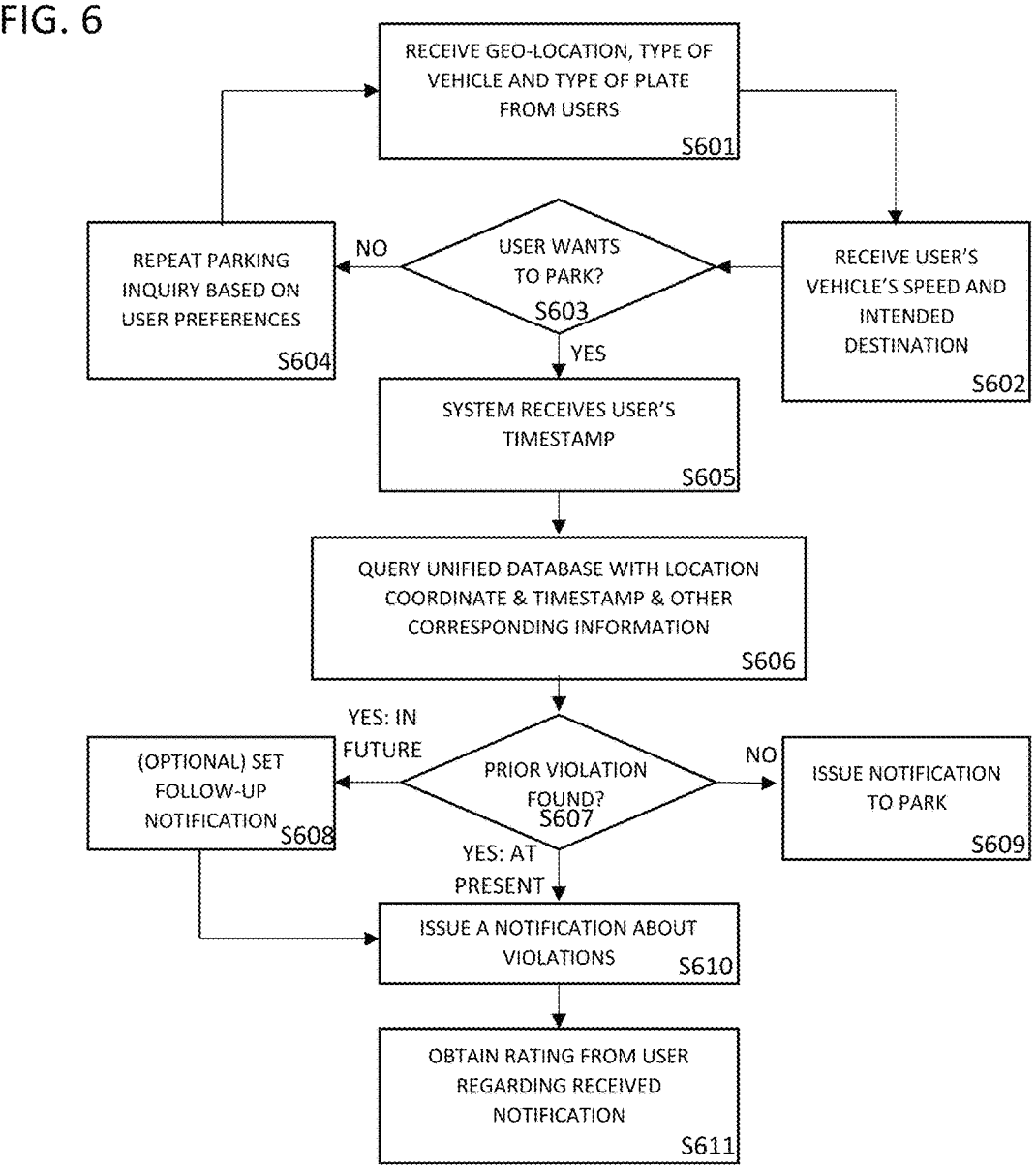
FIG. 6 is a flowchart illustrating a method to alert the user based on the data in the unified database in accordance with an exemplary embodiment of the present invention.

FIG. 6 is a flowchart illustrating a method and system to alert the user based on the data in the unified database in accordance with an exemplary embodiment of the present invention. The location coordinates of drivers may be transmitted to the system, for example periodically, and the system may receive this coordinate data, i.e. geolocation, as well as information about their type of vehicle and type of vehicle plate from the drivers S601. The driver's current speed and intended destination may be received by the system from the computing device 106 of the user S602. The system may then query the user on the intent to park S603. If yes, then the system may identify the current time (timestamp) S605. If no, then the system may repeat parking query based on user's preferences S604. The system may also continue to receive location coordinates from the driver S601 and the vehicle's speed and intended destination S602 to determine the user's parking intent.

In the event that it is determined that the driver is parking S603, the system may then receive the user's timestamp S605, corresponding to the present time. The unified database 102 may be queried by the system with the driver's present location and present time and other information S606 to determine, if there is any applicable prior parking violation S607. Where it is determined that the database does not contain data of prior violations for that location, then the user may be issued a notification that the user may park at that location S609. Where it is determined that citations have occurred at the location and are applicable to the driver's user type and to the present time/day S607, then a notification may be issued to the user not to park S610. Where it is determined that citations have occurred at the location at a time or day applicable in the near future (within a period of time that one is likely to be parked for) S607, then an optional follow-up notification may be set by the user S608, so that the user may be notified by the system with a notification S610 at a later time to remind the user of the need to leave the parking location prior to the time or day when parking violations are known to have occurred. The central computing system 100 may obtain ratings from the user S611, as to whether the notification be or she received is accurate.

Figure 7:
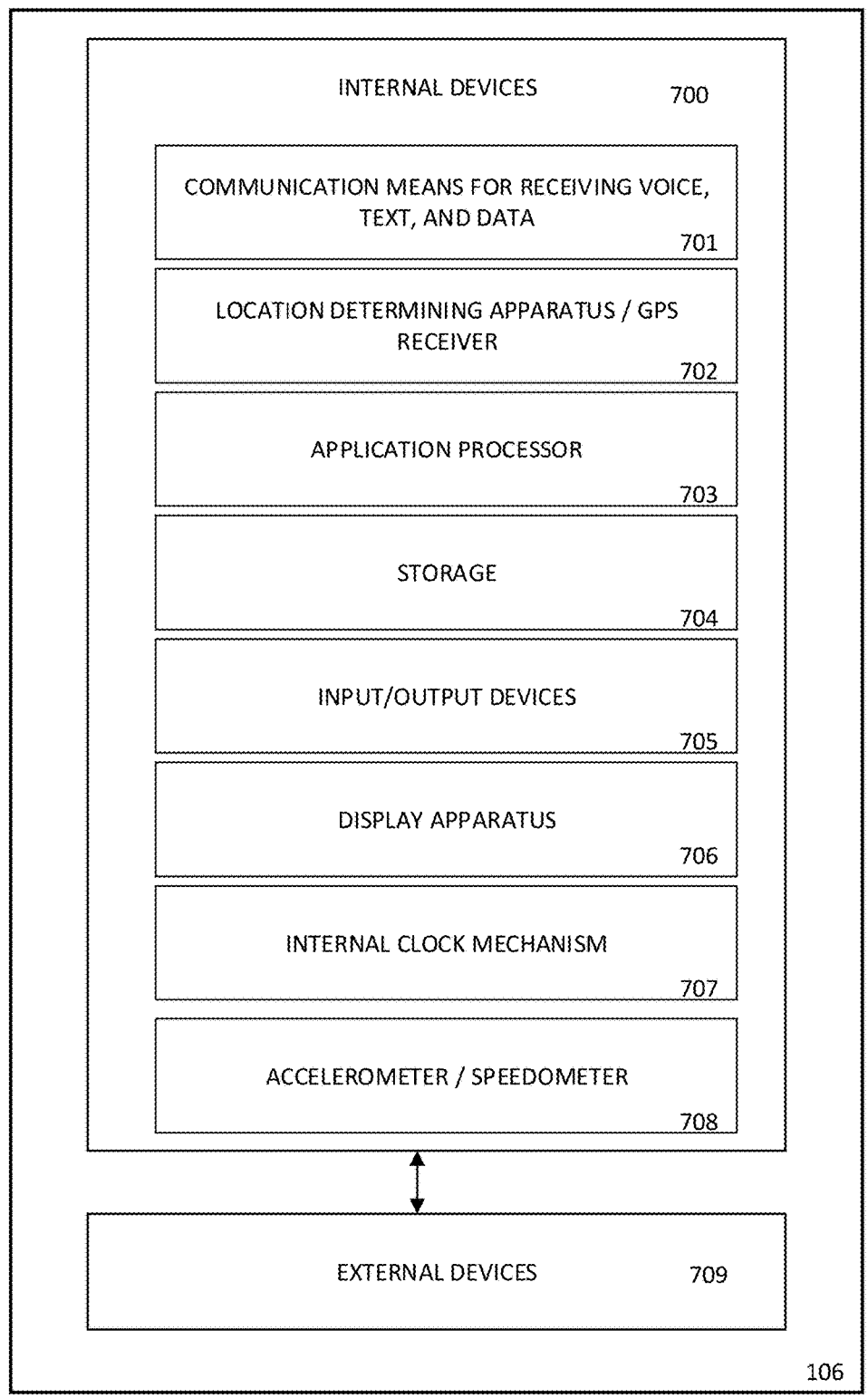
FIG. 7 is a schematic diagram illustrating the components of a computing device in accordance with an exemplary embodiment of the present invention.

FIG. 7 is a schematic diagram illustrating the composition of a computing device for reporting parking violations and receiving a notification with parking violation related data in accordance with an exemplary embodiment of the present invention. The computing device 106 may be in communication with all its components, tangible or intangible, and may incorporate internal devices 700 and external devices 709. The computing device 106 may be a device such as a mobile device or in-vehicle navigation system, and it may utilize a communications means for receiving voice, text, and data 701 for connecting to the central computing system 100 such as over the Internet or other cellular/wireless connections 103. The computing device 106 may include location determining apparatus or OPS receiver 702 for identification of a present location. An application processor 703 may be used for executing software on the computing device. The computing device may also contain storage such as random access memory (RAM) or flash storage 704. Input/output devices 705 may be used to connect the computing device to other system implements, especially depending on the available functionalities of a computing device. For example, an in-vehicle navigation system might not have a camera, while a mobile device may have a camera built in. In this instance, a camera may be included as an input for the in-vehicle navigation system. Other I/O devices may include a, a microphone, and/or a speaker. The computing device may also include a display apparatus 706, which may receive and display a notification or other data to a user received from the central computing system 100. The display apparatus 706 may, for example, be an electronic touchscreen display. The computing device may also communicate with an internal clock mechanism 707 to determine the present time. An accelerometer or a speedometer 708 may also be in communication with the mobile device, which may measure speed, acceleration, or directional changes. External devices 709 may connect to the computing device as well, through a wired or wireless connection. These external devices may be any device that may compensate for certain missing functionalities of any certain computing device, whether it may be a mobile device such as a tablet or smartphone or an in-vehicle navigation system or other computing device, etc.

Figure 8:
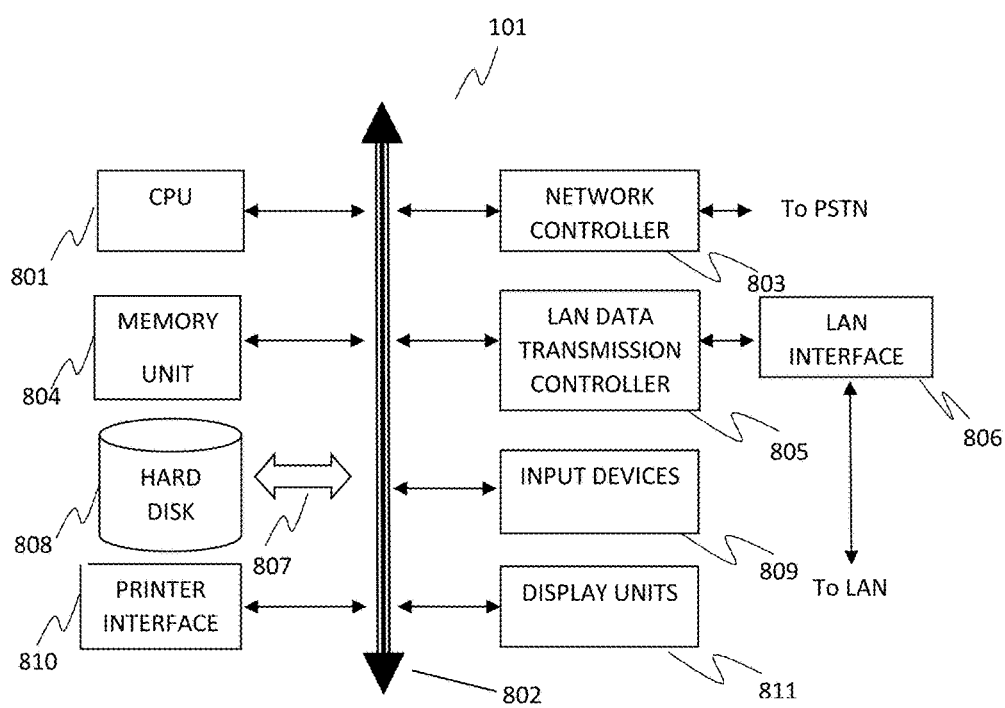
FIG. 8 is a schematic diagram illustrating the physical composition of a remote operative server that may implement a method and system of the present invention in accordance with an exemplary embodiment of the present invention.

FIG. 8 shows the physical composition of a remote operative server 101 that may implement a method and system of the present invention in accordance with an exemplary embodiment of the present invention. The system and method of the present disclosure may be implemented in the form of a software application running through connectivity means of a central computing system, for example, a mainframe, personal computer (PC), handheld computer, server, etc. The software application may be stored on a recording media locally accessible by the central computing system and accessible via a hardwired or wireless connection to a network, for example, a local area network, or the internet.

The operative server 101 referred to generally as server that may include, for example, a central processing unit (CPU) 801, a memory unit 804, a printer interface 810, display units 811, a local area network (LAN) data transmission controller 805, a LAN interface 806, a network controller 803 connected to PSTN (Public Switched Telephone Network), an internal bus 802, and one or more input devices 809, for example, a keyboard, mouse etc. As shown, the system may be connected to a data storage device, for example, a hard disk 808 via a link 807.

Figure 9:
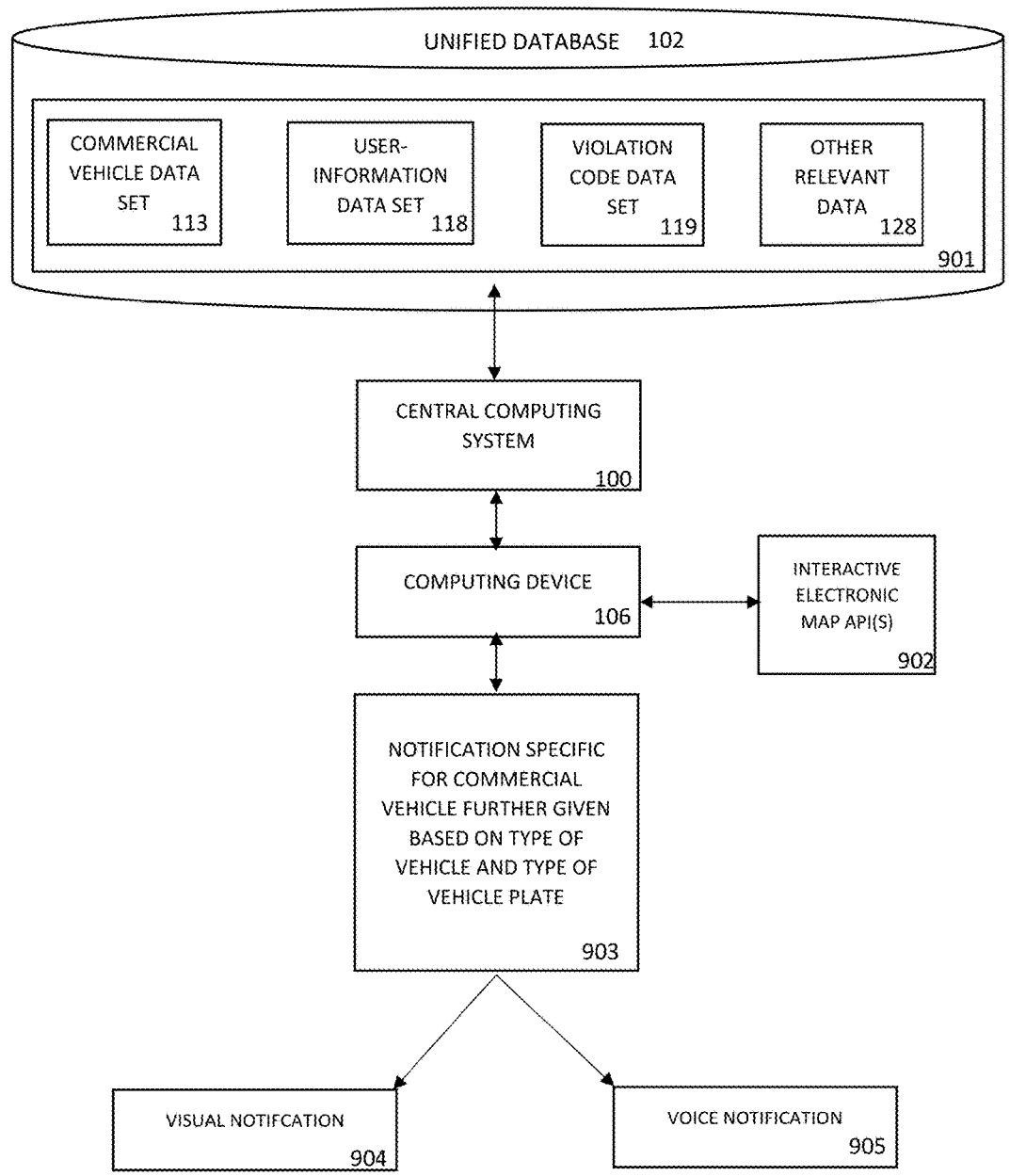
FIG. 9 is a schematic diagram illustrating a computing device in communication with the central computing system receiving a notification for commercial vehicles in accordance with an exemplary embodiment of the present invention.

FIG. 9 is a schematic diagram illustrating a system and method for a computing device to connect with the system's unified database 102 through the central computing system 100 and receive a notification corresponding to commercial vehicles in accordance with an exemplary embodiment of the present invention. A combination of data in the unified database for generating a notification for commercial vehicles 901 may include the commercial vehicle data set 113, user-information data set 118, violation code data set 119, and other relevant data 128. The computing device 106 connects to central computing system 100, which, in turn, connects to the combination of data in the unified database for generating a notification for commercial vehicles 901, is configured to integrate with an interactive electronic map API 902, such as GOOGLE MAPS API, as well as receive and display a notification relating to the user type of the user. The notification may be specific for a commercial vehicle, where the notification is specifically relevant in its information. The information contained within a notification 903 may be based on specific data from the combination of data for commercial vehicles 901, as the notification may be selectively issued based on the user's user type, further based on type of vehicle and type of vehicle place. This notification may be delivered in two ways: visually 904 and/or by voice 905.

Figure 10:
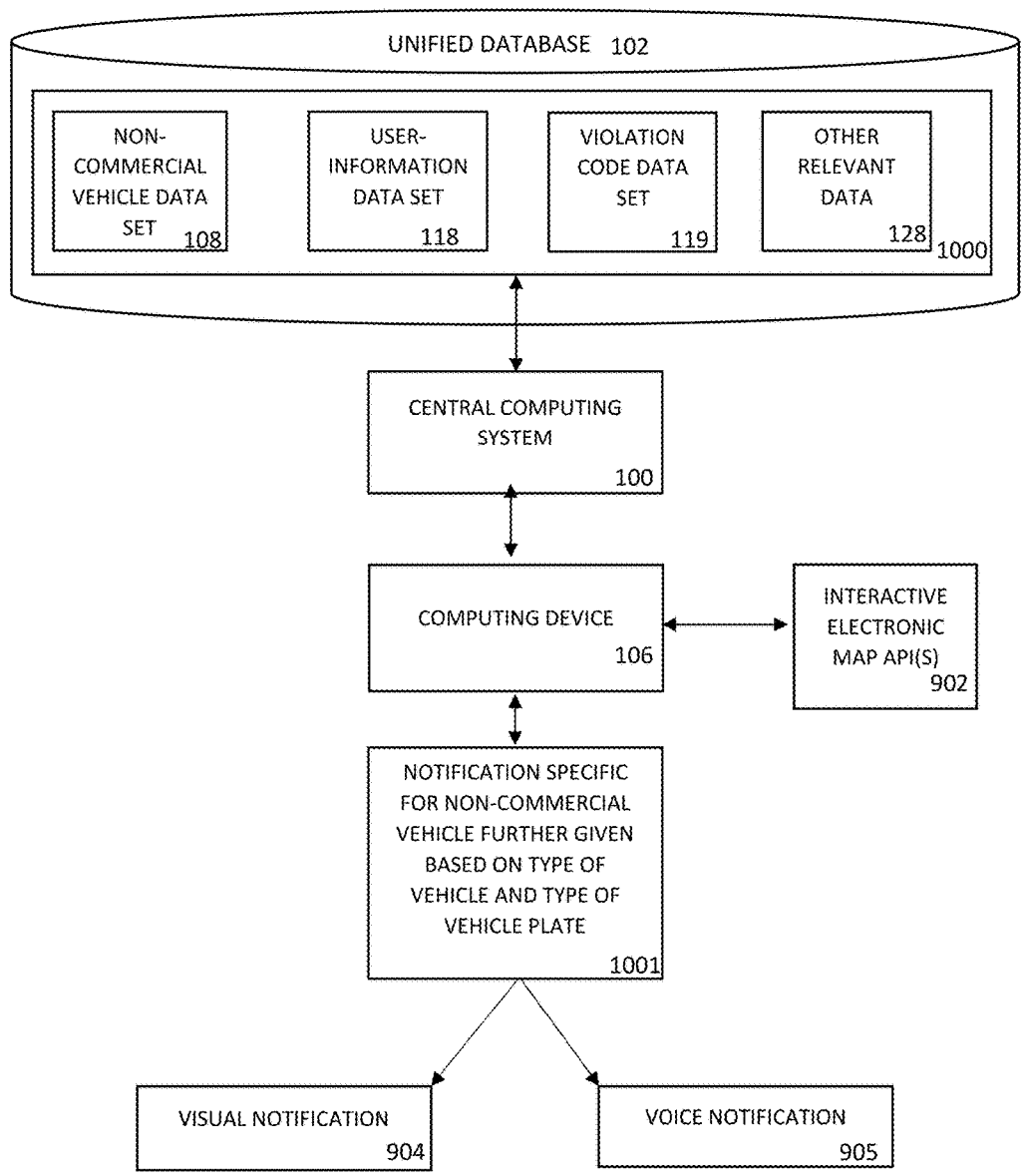
FIG. 10 is a schematic diagram illustrating a computing device in communication with the central computing system receiving a notification for non-commercial vehicles in accordance with an exemplary embodiment of the present invention.

FIG. 10 is a schematic diagram illustrating a system and method for a computing device to connect with the system's unified database 102 through the central computing system 100 and receive a notification corresponding to non-commercial vehicles in accordance with an exemplary embodiment of the present invention. A combination of data in the unified database for generating a notification for non-commercial vehicles 1000 may include the non-commercial vehicle data set 108, user-information data set 118, violation code data set 119, and other relevant data 128, which may be used to generate a notification for a non-commercial vehicle through the central computing system 100. The computing device 106 connects to central computing system 100, which, in turn, connects to the combination of data in the unified database for generating a notification for non-commercial vehicles 1000. The computing device 106 may be configured to integrate with an interactive electronic map API 902, such as GOOGLE MAPS API, as well as being configured to receive and display a notification. The information contained within a notification 1001 may be based on specific data from the unified database for non-commercial vehicles 1000, as the notification may be selectively issued based on the user's user type, and further based on the type of vehicle and type of vehicle plate. This notification 1001 may be delivered in two ways: visually 904 and/or by voice 905.

Figure 11:
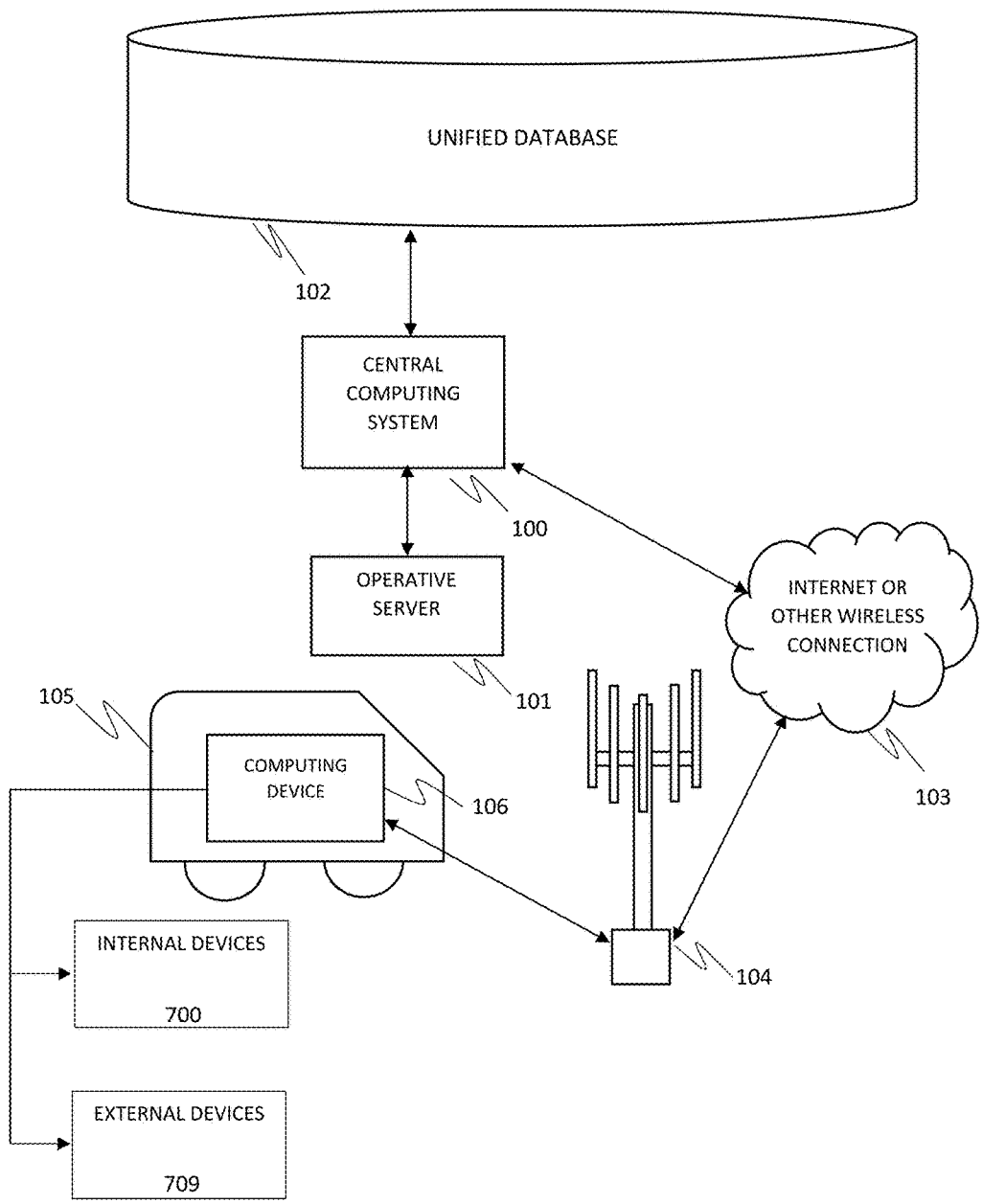
FIG. 11 is a schematic diagram illustrating a system for using data in the unified database to alert drivers of parking violation occurrences through a central computing system and a computing device in accordance with an exemplary embodiment of the present invention.

FIG. 11 is a schematic diagram illustrating a system for using the unified database to alert drivers of parking violation occurrences through a computing device in accordance with an exemplary embodiment of the present invention. The computing device 106 may communicate with a network of communications base stations 104 and may interact with the central computing system 100 via the Internet or other wireless connections 103. The operative server 101 may be instantiated as one or more server computers and/or virtual machines that may work together with the communicative means of the central computing system 100 to collect the parking violation related data from a plurality of sources, to determine when drivers warrant a notification, and to provide the drivers with the notification. The operative server 101 may accomplish this by accessing parking violation related data from data sets in the unified database 102. The central computing system 100 may periodically query the data sets in the unified database 102. Alternatively, the central computing system 100 may access parking violation related data in the unified database 102 using specific APIs, by subscription, or by being pushed this data as it is made available. The computing device 106 may be installed in the vehicle 105 or may be a mobile device of a user. The computing device 106 may connect with its internal devices 700 and external devices 709 in communication with it in order to communicate with the central computing system 100 to relay data such as time, date, location etc., receive a notification, process, and display that notification to the user. The central computing system 100 may generate the notification for a non-commercial vehicle user and a commercial vehicle user separately.

Figure 12:
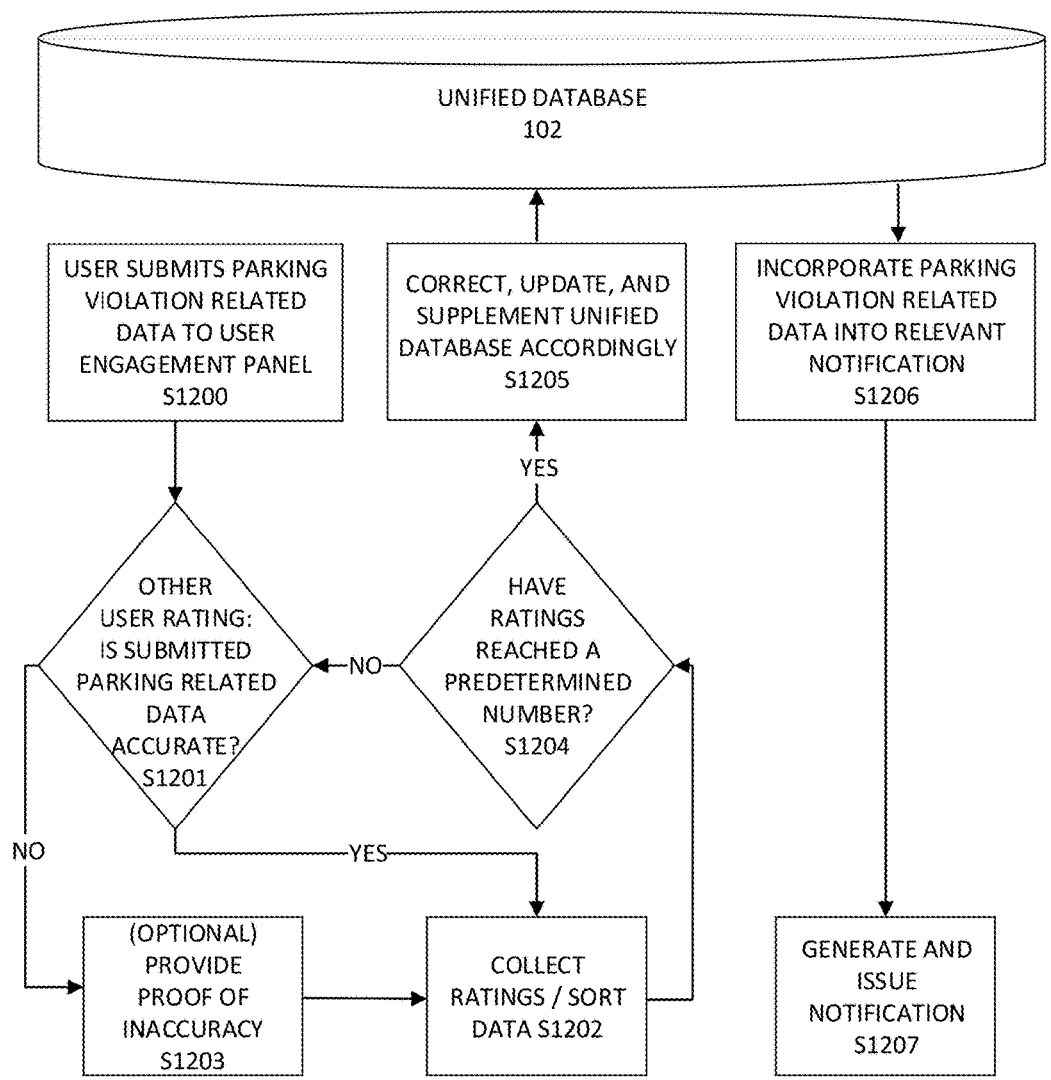
FIG. 12 is a flowchart illustrating a process of rating data submitted to the user engagement panel to correct, update, and supplement parking violation related data within the unified database in accordance with an exemplary embodiment of the present invention.

FIG. 12 is a flowchart illustrating the process of rating parking violation related data submitted to the user engagement panel in accordance with an exemplary embodiment of the present invention, and how those ratings of the data affect the data within the unified database 102. The first step in this process is the user submitting parking violation related data to the user engagement panel S1200. This parking violation related data may include a parking signage redesign regarding translation into a different language or clarification of content, suggestion on how to avoid a parking violation citation, etc. That information is then rated by other users, depending on its accuracy S1201. The system collects and uses user ratings (positive and negative) to sort the contributed parking violation related data S1202. If any user rates the submitted parking violation related data negatively as to it accuracy, that user has an option to provide proof of why that parking violation related data may be wrong S1203. Ratings may be collected by the system until it is determined that positive ratings have reached a predetermined number S1204. If the number of ratings has not reached the predetermined number, the system may continue to collect ratings from other users S1201. If the number of positive ratings has reached a predetermined number, then the contributed parking violation related data may be used to correct, update, and supplement the unified database accordingly S1205. Thus, correcting, updating, and supplementing the unified database may be from positive or negative ratings. Positive ratings may be used to replace or reinforce the data in the unified database, and negative ratings may be used to identify or invalidate inaccurate data. Once in the unified database, that contributed parking violation related data may be incorporated into a relevant notification regarding that parking violation related data S1206. For example, if the parking violation related data submitted to the user engagement panel was suggestion on how to avoid receiving a parking violation citation at a particular location, that suggestion or its data may be included within the notification that is relevant to that location and that is subsequently generated and issued S1207 to an applicable user.

Figure 13:
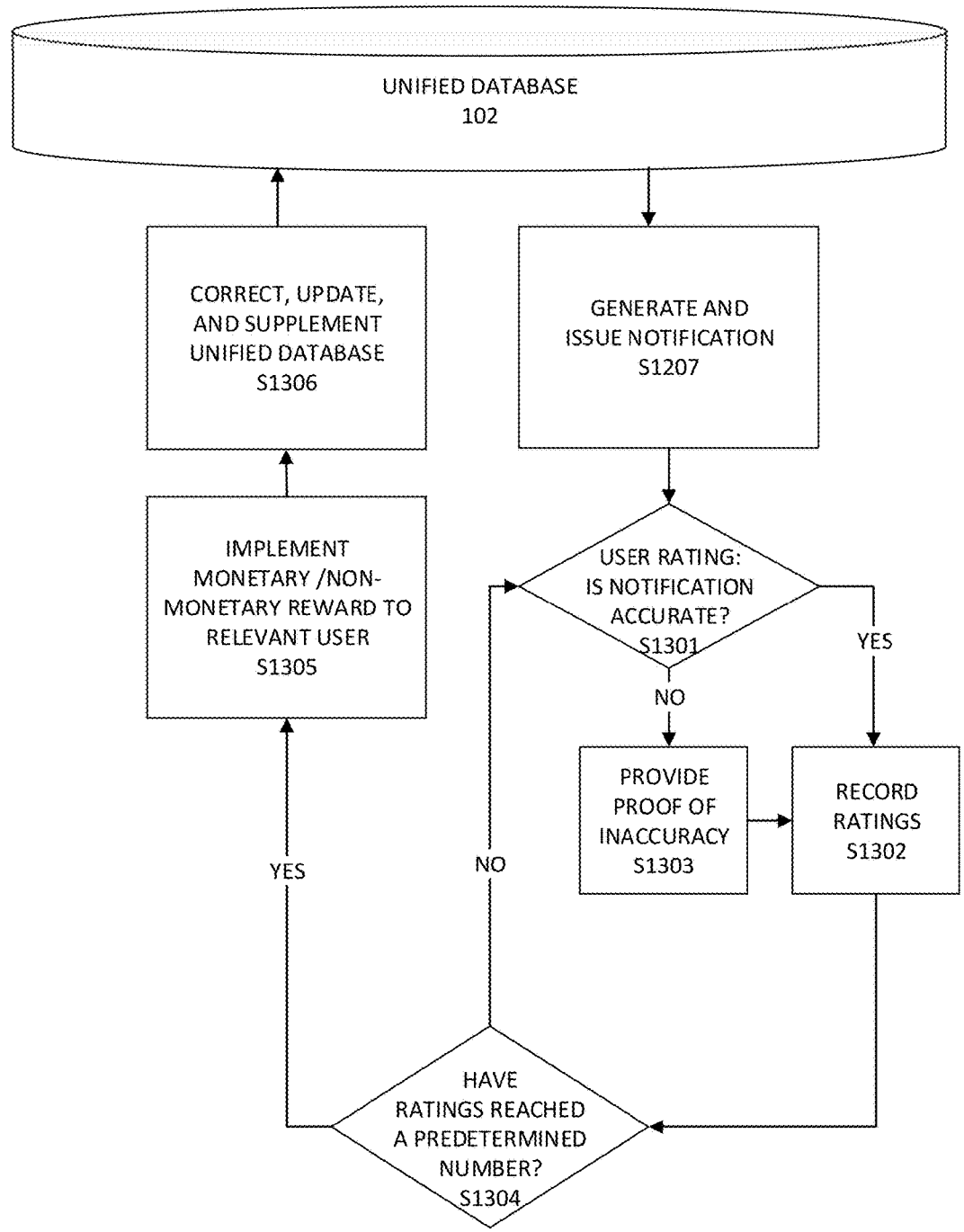
FIG. 13 is a flowchart illustrating a circular process of rating a notification to dynamically correct, update, and supplement parking violation related data within the unified database in accordance with an exemplary embodiment of the present invention.

FIG. 13 is a flowchart illustrating a circular process of rating a notification to correct, update, and supplement parking violation related data within the unified database 102 in accordance with an exemplary embodiment of the present invention. Once a user's parking intent is identified, the system may use parking violation related data contained within the unified database 102, to generate and issue a notification that warns a user about a potential parking violation, S1207. This notification may be in part based on the parking violation related data from an informational source, or it may be in part based on parking violation related data from a submission to the user engagement panel which received enough ratings to be incorporated into a notification. In any case, this information allows the user to park knowing the parking rules that apply to the current parking location. After having received a notification, the user can rate the notification and may judge or comment on whether the notification was accurate S1301. If the user rates the notification positively, e.g., that the notification was accurate, the system may record the user's positive rating S1302. Accordingly, accurate data that leads to an accurate notification may be reinforced and otherwise kept in place. If the user rates the notification negatively, e.g., that the notification was inaccurate, the user may then provide proof of why the notification was inaccurate S1303; a negative rating may be given to a notification when, for example, the parking prohibitions in effect for a particular location are in fact different from those cited in the notification, such as incorrect timing or day of the week information. In the case where the notification does not accurately reflect the parking rules, a user would submit a picture of the parking sign or another type of evidence as proof of that notification's inaccuracy in that situation. The system then records that user's negative rating S1302. The ratings are recorded and collected until a certain type of rating, in this case, positive or negative ratings, reaches a predetermined number S1304. If the number of positive ratings reaches a predetermined number, then a monetary or non-monetary reward may be implemented to the relevant user S1305, who first submitted parking violation related data contained within the rated notification. Since the negative rating is supported by proof, negative ratings, once they reach a predetermined number, can be used to correct, update, and supplement S1306 the existing parking violation related data within the unified database 102. For instance, some inaccurate data may be removed from the unified database and from the corresponding notification. This corrected, updated, and supplemented data in the unified database is then used to provide a user with new and more accurate notifications. This is a cycle, as the new notification, which is based on the unified database, corrected, updated, and supplemented by ratings of parking violation related data submitted to the user engagement panel, is likewise subject to ratings when parking intent is identified and a notification for a location is issued S1207.

Figure 14:
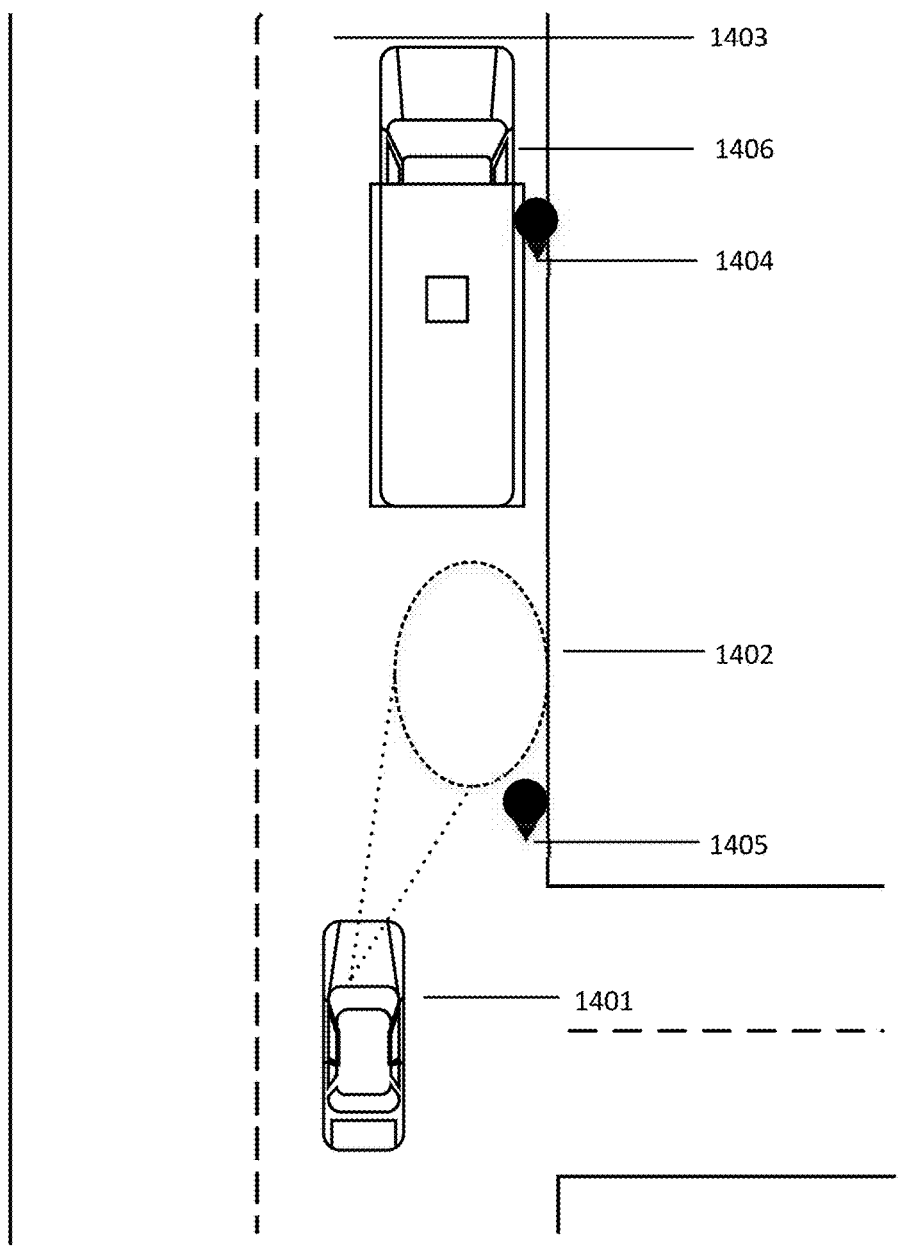
FIG. 14 is a diagram for describing a system for inferring a potential parking prohibition based on location in accordance with an exemplary embodiment of the present invention.

FIG. 14 is a diagram illustrating a system for inferring a potential parking prohibition based on location in accordance with an exemplary embodiment of the present invention. In this exemplary depiction, a user 1401 of a non-commercial vehicle user type is shown. The user 1401 intends to park in a location 1402 which is likely to result in violation of a parking prohibition as determined by the system. Shown in the figure is the street 1403 that the user 1401 intends to park on. The user's intended parking location 1402 falls between the two other parking locations 1404 and 1405. Location 1404 is wholly occupied by a commercial vehicle 1406; however, the occupancy of a parking location 1404 does not affect the system's ability to infer a potential parking prohibition for the user's intended parking location 1402. In this example, the unified database has a record of at least one parking violation citation issued at location 1404 to a user of a non-commercial vehicle for parking in the commercial-vehicle only zone. The unified database also has a record of at least one parking violation citation issued in location 1405, likewise to another user of a non-commercial vehicle for parking in a commercial-vehicle only zone. The system, however, does not bear any parking violation related data for location 1402. Nevertheless, the system may be able to infer, based on existing violations at locations 1404 and 1405, that the user 1401 is likely to receive a parking violation citation for parking in location 1402.

Figure 15:
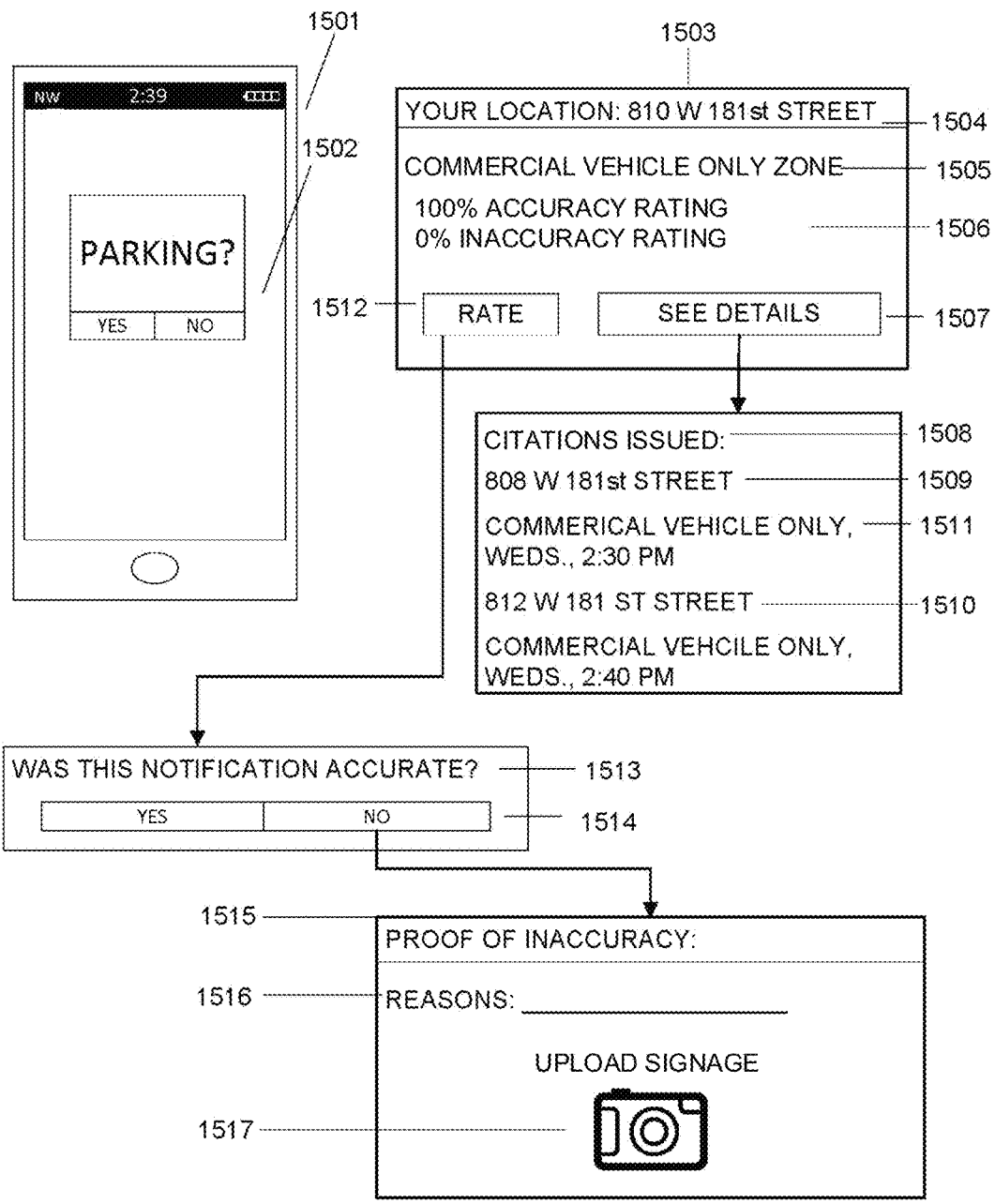
FIG. 15 is a diagram illustrating a user's computing device and a notification that a user may receive regarding a potential location-related parking prohibition in accordance with an exemplary embodiment of the present invention.

FIG. 15 is a diagram illustrating a user's computing device and a notification that a user may receive regarding a potential parking prohibition based on location in accordance with an exemplary embodiment of the present invention. Once the system identifies the user's parking intent, as depicted in FIG. 14, the system prompts the user to confirm his or her parking intent on the user's computing device 1501 by clicking either "yes" or "no" 1502. When the user is parking and has clicked "yes," the system may be prompted to display a notification to the user regarding parking any parking prohibition 1503 based on the user's current geolocation 1504. Although these dialog windows are not illustrated as being displayed within the user's computing device 1501, it is to be understood that this showing is merely for the purposes of providing a clear illustration, and it is to be understood that these dialog windows would be displayed within the user's computing device 1501.

In this figure, the user's current geolocation is 810 W 181st Street. The notification may include a summary of relevant information, such as what parking rule or regulation applies to the user's intended parking location, which in this case is a prohibition regarding non-commercial vehicles parking in a commercial-vehicle only zone 1505. Also displayed is a comparison of the collected ratings 1506 for this notification. In this example, the user's notification has been proven to be accurate by a 100 percent of users' ratings, and inaccurate by 0 percent. If the user would like to know the reasoning behind this notification, the user may click "See Details" 1507 to see details relating to why the system has generated this notification. Then, the system may reference any relevant citations issued 1508. In this case, there are two relevant citations, 1509 and 1510, both of which were issued on the relevant day of the week at the relevant time at 808 W 181st Street and 812 W 181st Street, respectively; both citations were issued to non-commercial vehicle users for parking in a commercial-vehicle only zone 1511. The user can then rate this notification and its related information regarding its accuracy 1513 by clicking on a "Rate" button 1512 that brings up the notification rating panel on the user's computing device 1514. This way the user may give a positive rating of "Yes" or a negative rating of "No" to the notification. By giving the negative rating, the system may prompt the user to submit proof of inaccuracy 1515. In this prompt, the system may ask the user to submit or type in the reasons as to why the notification was inaccurate 1516 and submit a picture of the signage in question or a parking violation citation 1517. It is to be understood that the street address used in the above example is not intended to be a reflection of actual data points, nor is it intended to reflect actual parking prohibitions or parking situations; it is intended to be used for illustrative purposes.

Figure 16:
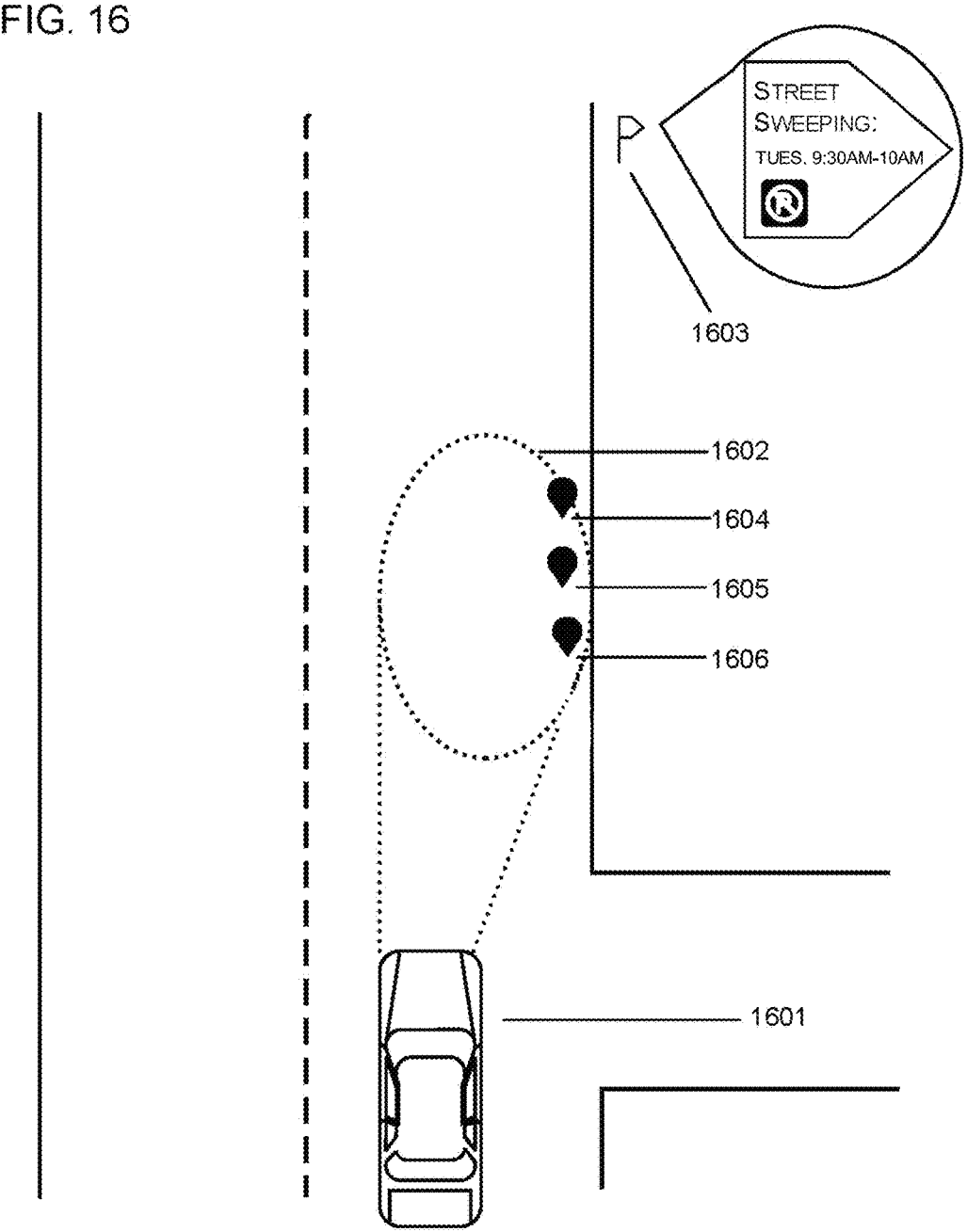
FIG. 16 is a diagram illustrating a system for inferring a potential parking prohibition based on time in accordance with an exemplary embodiment of the present invention.

FIG. 16 is a diagram illustrating a system for inferring a parking prohibition based on time for a user 1601 in accordance with an exemplary embodiment of the present invention. Shown in the figure is the user's intended parking location 1602. Once parking intent of the user 1601 is identified, the system may automatically display parking signage corresponding to location 1602 on the user's computing device, as the user cannot see a sign 1603 located further down the same street, which shows that parking is prohibited on Tuesdays between 9:30 AM and 10 AM due to street sweeping. The system may also alert the user of any potential parking prohibition based on inference drawn from the times when parking violation citations were issued at location 1602 and parking rules or regulations applicable to that user's user type. In this example, the database contains several parking violation citations 1604, 1605, and 1606, issued at location 1602 issued for parking during street sweeping hours, as identified by the parking sign 1603.

Figure 17:
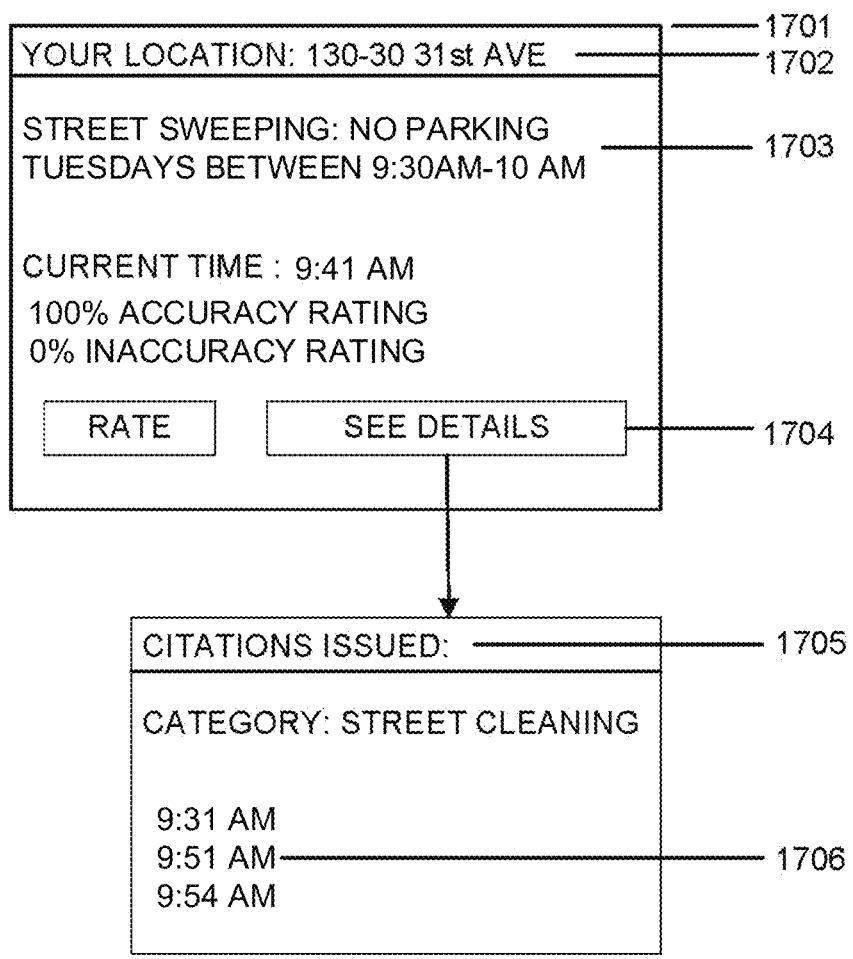
FIG. 17 is a diagram illustrating a user's computing device and a notification that a user may receive regarding a potential time-related parking prohibition in accordance with an exemplary embodiment of the present invention.

FIG. 17 is a diagram illustrating a notification 1701 that a user may receive regarding a potential parking prohibition based on time in accordance with an exemplary embodiment of the present invention. Thus, based on the user's intended parking location and the parking violation related data associated with the user's geolocation 1702, 130-30 31st Avenue, and current time and day, Tuesday, 9:41 AM, the system might issue a notification to advise the user against parking in location 1702 because, according to the data in the database, no parking is permitted between 9:30 AM and 10 AM due to street sweeping 1703. If the user is curious about the details of this notification, the "See Details" button is available to click 1704. When the user clicks on the button, the user is taken to a panel that displays the relevant category of citations issued at location 1702. In this case, the category of applicable citations is street cleaning 1705, which is also the reason for these citations' issuance. Also displayed are the relevant times of when those citations were issued 1706; since the database contains a record of parking citations issued at 9:31 AM, 9:51 AM and 9:34 AM, and the current time is 9:41 AM, the system may infer that the user may potentially receive a parking violation citation by parking at location 1702 at this current time, 9:41 AM.

An exemplary embodiment of the present invention described herein is illustrative, and many variations can be introduced without departing from the spirit of the disclosure. For example, elements and/or features may be combined with each other and/or substituted for each other within the scope of this disclosure and appended claims. Furthermore, any element described herein in the singular is not intended to limit that element only to the singular. For example, "a user" or "the user" is not intended to mean one and only one user; it is intended to encompass one or more users. Likewise is the case with any other element herein unless specifically indicated otherwise. In addition, the term "exemplary" herein is used to describe an element as an example of the present invention, not to describe an element as a preferred embodiment of the present invention.

The invention claimed is:

1. A method for providing parking violation avoidance guidance, the method comprising:
   utilizing a computing system in communication with a user and a plurality of additional users through a plurality of computing devices;
   utilizing at least one database in communication with the computing system and configured to store parking violation related data;
   clustering the parking violation related data into data types comprising at least one of commercial vehicle, non-commercial vehicle, type of vehicle, or type of vehicle plate;
   identifying a time, a date, a location, and a user type associated with a user;
   analyzing the parking violation related data to predict a potential parking violation using the identified location, the identified time, the identified date, and the parking violation related data;
   generating at least one notification including at least a portion of the parking violation related data corresponding to the identified location and the user type of the user; and
   transmitting the at least one notification to the user.

2. The method according to claim 1, further comprising:
   receiving positive ratings or negative ratings for the parking violation related data from the user or a set of the plurality of additional users having firsthand experience with the identified location.

3. The method according to claim 2, further comprising:
   identifying the firsthand experience as passing or having passed within a predetermined distance from the identified location, or identifying the firsthand experience as receiving or having received the at least one notification.

4. The method according to claim 2, further comprising:
   issuing, upon the at least one notification receiving, a predetermined number of the positive ratings, a reward to a particular user who shared the parking violation related data included in the at least one notification.

5. The method according to claim 1, further comprising:
   issuing a reward responsive to the shared parking violation related data including a reason or a recommendation, and the reason or the recommendation receiving a predetermined number of positive ratings.

6. The method according to claim 1, further comprising: analyzing the parking violation related data to predict the potential parking violation, wherein the potential parking violation is directly applicable to the user.

7. The method according to claim 6, wherein the parking violation directly applicable to the user is predicted based on at least one of: (i) the parking violation related data including a location identical to the identified location; (ii) the parking violation related data including a point in time identical to the identified time; or (iii) the parking violation related data including a location identical to the identified location corresponding to a point in time identical to the identified time.

8. The method according to claim 1, further comprising: analyzing, the parking violation related data to predict the potential parking violation, wherein the potential parking violation is applicable to the user by inference.

9. The method according to claim 8, wherein the inference is based on at least one of: (i) at least one relevant parking location; (ii) at least one relevant parking time; or (iii) at least one relevant parking location corresponding to at least one relevant parking time.

10. The method according to claim 8, wherein the inference is based on at least two parking violation citations previously incurred at at least two parking locations for violating a parking prohibition.

11. The method according to, claim 10, wherein the identified location is between the at least two parking locations, and
wherein the at least two parking locations are at a predetermined distance from each other.

12. The method according to claim 10, wherein the inference is based on the at least two parking times corresponding to one relevant parking time, and
wherein each of the at least two parking times is associated with at least one parking violation citation for violating a parking prohibition.

13. The method according to claim 10, wherein the inference is based on at least one parking violation citation previously incurred for violating the parking prohibition at the identified time of the user,
wherein the at least one previously incurred parking violation citation at the identified time is within a predetermined time frame based on the at least one parking rule or regulation, and
wherein the identified time is within the predetermined time frame.

14. The method according to claim 1, further, comprising: identifying a parking intent of the user based on a current speed of a vehicle of the user and a predetermined proximity to an intended destination as preset by the user,
wherein upon identification of the parking intent of the user, the at least one notification is issued to the user with the portion of the parking violation related data.

15. The method according to claim 1, further comprising: utilizing at least one user engagement panel configured to allow at least one additional user to share additional parking violation related data; and
clustering the additional parking violation related data shared by the at least one additional user according to the user type of each additional user, the user type comprising at least one of commercial vehicle user, non-commercial vehicle user, user type based on vehicle, or user type based on vehicle plate.

16. The method according to claim 1, further comprising: clustering into the data types the parking violation related data for a specific parking location shared by the user or the plurality of additional users through at least one user engagement panel.

17. The method according to claim 16, wherein the shared parking violation related data comprises at least one of: (i) a parking violation citation not currently stored in the database; (ii) a suggestion for avoiding receiving a parking violation citation; (iii) a recommendation for disputing the parking violation citation; or (iv) a redesign of parking signage relating to plain language meaning, content clarification, or language translation.

18. The method according to claim 16, wherein the parking violation related data associated with, the specific parking location is subject to ratings from a set of the plurality of additional users having firsthand experience, and
wherein the at least one user engagement panel automatically displays the parking violation related data based on the identified location.

19. The method according to claim 18, further, comprising:
modifying at least a part of the parking violation related data when the ratings of the parking violation related data for the specific parking location shared by the user or the plurality of additional users reaches a predetermined number.

20. The method according to claim 16, further, comprising:
identifying the parking violation related data as time-sensitive; and
modifying at least a part of the parking violation related data in the database immediately,
wherein the time-sensitive parking violation related data comprises at least a portion of a notice of temporary parking prohibition, or other time-sensitive parking violation related data.

21. The method according to claim 20, further comprising:
removing the time-sensitive parking violation related data from the database when the at least one notification having the time-sensitive parking violation related data reach receives a predetermined number of negative ratings.

22. The method according to claim 1, further comprising: acquiring additional parking violation related data from at least one source comprising the user, the plurality of additional users, at least one other interested individual, a government agency, a non-government organization, a private entity, a community organization, or media.

23. The method according to claim 1, wherein the at least one notification is generated at least according to a preference of the user, and comprises at least a portion of: at least one parking rule or regulation applicable to the identified location of the user, parking signage applicable to the identified location, parking meter locations and associated parking meter costs, a total number of previously issued parking related violation citations for the identified location, a street view with a photo or video for at least one location having a predetermined number of previously issued parking violation citations, or at least one reason for previously issued parking violation citations.

24. The method according to claim 23, wherein the preference is based on at least one of: content of the at least one notification, a time or a time frame of the at least one notification, or at least one location identified by the user; and wherein the at least one reason for the total number of previously issued parking related violation citations comprises at least a portion of: no stopping anytime, no standing anytime, no parking anytime, no parking during indicated hours, metered parking, street cleaning, active driveway, bus stop, tire hydrant, tow away zone, or any other temporary or permanent parking prohibition.

25. The method according to claim 1, further comprising:
collecting tow away zone information comprising at least one of:
a time frame when parking is illegal at the identified location and when a vehicle of the user may be towed, or a distance where parking is illegal and where the vehicle may be towed.

26. The method according to claim 1, wherein the at least one notification further comprises tow away information comprising information about tow away zones comprising relevant information about one of towing companies, costs, or other penalties associated with a vehicle being towed, the information about the tow away zones delivered to the user as part of the at least one notification or made accessible to the user through at least one user engagement panel.

27. The method according to claim 1, further comprising:
modifying historical parking violation related data included in the parking violation related data based on real-time parking violation related data or other historical parking violation related data.

28. The method according to claim 1, further comprising:
utilizing a clock mechanism in communication with the plurality of computing devices for determining the identified time and the identified date;
utilizing a location determining apparatus in communication with the plurality of computing devices for determining the identified location; and
utilizing a display apparatus in communication with the computing system and configured to display the at least one notification to the user.

29. The method according to claim 1, wherein the transmitting of the at least one notification to the user includes communicating with the user via a display apparatus configured to display the at least one notification in a format based on at least one of: audio, video, text, text-based, text-based message, image, street view image, or any combination thereof.

30. The method according to claim 1, further comprising:
transmitting the at least one notification to the plurality of additional users through the plurality of computing devices.

31. The method according to claim 1, wherein at least one of the following applies for the data type corresponding to the user type:
the commercial vehicle data type at least corresponds to a commercial vehicle user type;
the non-commercial vehicle data type at least corresponds to a non-commercial vehicle user type;
the data type based on type of vehicle at least corresponds to a user type based on type of vehicle;
the data type based on type of vehicle plate at least corresponds to a user type based on type of vehicle plate;
a motorcyclist data type at least corresponds to a motorcyclist user type;
a bicyclist data type at least corresponds to a bicyclist user type; or
a pedestrian data type at least corresponds to a pedestrian user type.

32. The method according to claim 1, wherein at least one of the plurality of computing devices is integrated within an onboard vehicle computing, system including at least a display apparatus configured to display the at least one notification to the user.

33. A system or providing parking violation avoidance guidance, the system comprising:
a computing system having at least one processor in communication with a user and a plurality of additional users through a plurality of computing devices, wherein the at least one processor is configured to:
store and cluster parking violation related data in a database into data types comprising at least one of: commercial vehicle, non-commercial vehicle, type of vehicle, or type of vehicle plate,
identify a time, a date, a location, and a user type associated with the user;
analyze the parking violation related data applicable to the user directly or applicable to the user by inference to predict a potential parking violation using the identified location, the identified time, the identified date, and the parking violation related data;
generate at least one notification including at least a portion of the parking violation related data corresponding to the identified location and the user type of the user; and
transmit the at least one notification to the user.

34. The system according to claim 33, wherein the at least one processor is further configured to:
modify at least a portion of the parking violation related data with additional parking violation related data not previously stored in the database.

35. The system according to claim 34, wherein the at least one processor is further configured to:
incorporate at least the portion of the additional parking violation related data into the at least one notification, wherein the at least one notification is subject to ratings by a set of the plurality of additional users having, firsthand experience.

36. The system according to claim 35, wherein the firsthand experience is identified as passing or having passed within a predetermined distance of a location identified in the notification, and wherein the ratings are provided by the set of the plurality of additional users having, the firsthand experience through a user engagement panel.

37. The system according to claim 35, wherein the at least one processor is further configured to:
responsive to the portion of the at least one notification receiving a first predetermined number of positive ratings, issue a reward to a particular user who shared the portion of the additional parking violation related data incorporated into the at least one notification.

38. The system according to claim 37, wherein the portion of the parking violation related data is modified based on the positive ratings reaching a second predetermined number.

39. The system according to claim 33, wherein the at least one processor is further configured to:
analyze the parking violation related data to predict a parking violation directly applicable to the user.

40. The system according to claim 33, wherein the parking violation directly applicable to the user is predicted based on at least one of: (i) the parking violation related data including a respective location identical to the identified location; or (ii) the parking violation related data including a respective time identical to the identified time; or (iii) the parking violation related data including a respective location identical to the identified location corresponding to a respective time identical to the present time.

41. The system according to claim 33, wherein the at least one processor is further configured to:
analyze the parking violation related data to predict the potential parking violation applicable to the user by inference.

42. The system according to claim 41, wherein the inference is based on at least one of: (i) at least one relevant parking location; (ii) at least one relevant parking time; or (iii) at least one relevant parking location corresponding to at least one relevant parking time.

43. The system according to claim 41, wherein the inference is based on at least two parking violation citations previously issued at at least two parking locations for violating a parking prohibition.

44. The system according to claim 43, wherein the identified location is between the at least two parking locations, and
wherein the at least two parking locations are at a predetermined distance from each other.

45. The system according to claim 43, wherein the inference is based on the at least two parking locations corresponding to one relevant parking time, and
wherein each of the at least two parking locations is associated with at least one parking violation citation for violating the parking prohibition.

46. The system according to claim 41, wherein the inference is based on at least one parking violation citation previously issued for violating the parking prohibition at the identified location and within a predetermined time frame, and the inference is based on at least one parking rule or regulation, and wherein the identified time is within the predetermined time frame.

47. The system according to claim 33, wherein the at least one, processor is further configured to:
identify a parking intent of the user based on a current speed of a vehicle of the user and a predetermined proximity to an intended destination as preset by the user, and
wherein upon identification of the parking intent of the user, the at least one notification is issued to the user.

48. The system according to claim 33, further comprising:
at least one user engagement panel configured to at least collect the parking violation related data from the user or the plurality of additional users.

49. The system according to claim 33, wherein the at least one processor is further configured to:
cluster, into the data types, the parking violation related data for a specific parking location collected from the user or from a set of the plurality of additional users through at least one user engagement panel.

50. The system according to claim 49, wherein the parking violation related data associated with the specific parking location is subject to ratings by the plurality of additional users through the at least one user engagement panel, and wherein responsive to the ratings, at least a portion of the parking violation related data associated with the specific parking location is automatically displayed to the user based on the identified location.

51. The system according to claim 49, wherein the parking violation related data is stored in the database, and wherein the at least one processor is further configured to:
modify at least a portion of the parking violation related data in the database according to the parking violation related data associated with the specific parking location based on the ratings reaching a predetermined number.

52. The system according to claim 51, wherein the parking violation related data associated with the specific parking location comprises at least one of real-time parking violation related data or historical parking violation related data.

53. The system according to claim 33, wherein the at least one processor is further configured to:
cluster data associated with the user or the plurality of additional users by user type, the user type comprising at least one of commercial vehicle user, non-commercial vehicle user, vehicle type user, or vehicle plate user.

54. The system according to claim 33, wherein the at least one notification is generated based on a preference of the user, and comprises at least one parking rule or regulation applicable to the identified location, parking signage applicable to the identified location of the user, parking meter locations, parking meter costs, a total number of previously issued parking violation citations for the identified location, a street view with at least one photo or video for a location having a predetermined number of previously issued parking violation citations, or at least one reason for a previously issued parking related violation citation.

55. The system according to claim 54, wherein the preference is based on at least one of: content of the at least one notification, time or time frame of the at least one notification, or one or more locations identified by the user.

56. The system according to claim 33, wherein the parking violation related data comprises at least one of: at least one parking rule or regulation, a parking violation record, a parking violation code, a parking violation statutory code, at least one abbreviation used by parking enforcement personnel, an associated fine or other penalty, parking signage with at least one location, a parking meter location, a parking meter cost, a street view with a photo or video for at least one location with at least a predetermined number of parking violation citations, a notice of temporary or permanent parking prohibition, tow away zone information, or other parking violation related data, and
wherein the at least one processor is further configured to gather at least the parking violation related data from at least one source selected from the group comprising the user, the plurality of additional users, an interested individual, a government agency, a government agency website, a website, a non-government organization, a private, entity, a community organization, and media.

57. The system according to claim 33, wherein the parking violation related data includes historical parking violation related data subject to modification by real-time parking violation related data or other historical parking violation related data.

58. The system according to claim 33, wherein the at least one notification further comprises at least one of:
a time frame when parking is illegal at the identified location;
a time frame when a vehicle of the user may be towed;
a distance within which parking is illegal; or
a distance within which a vehicle of the user may be towed.

59. The system according to claim 33, wherein the parking violation related data comprises at least one of: (i) a suggestion for avoiding receiving at least one parking violation citation; (ii) a recommendation for disputing, at least one parking violation citation; or (iii) a redesign of parking signage.

60. The system according to claim 33, wherein the at least one notification includes at least one reason for a previously issued parking related violation, and wherein the at least one reason comprises: no stopping anytime, no standing anytime, no parking anytime, no parking during indicated hours, metered parking, street cleaning, active driveway, bus stop, fire hydrant, tow away zone, or any other temporary or permanent parking related prohibition.

61. The system according to claim 33, further comprising:
a display apparatus, wherein the at least one processor is configured to instruct the display apparatus to display the at least one notification for the user.

62. The system according to claim 33, wherein the at least one, processor is further configured to:
collect tow away zone information, the tow away zone information comprising at least one, of:
a time frame when parking is illegal at the identified location and when a vehicle of the user may be towed;
a distance where parking is illegal and a vehicle of the user may be towed; or
information about private or public tow away zones comprising relevant information about towing companies, costs, and other penalties associated with a vehicle of the user being towed, wherein the information about private or public tow away zones is communicated to the user as part of the at least one notification.

63. The system according to claim 33, wherein the at least one processor is further configured to:
transmit the at least one notification to the plurality of additional users through the plurality of computing devices.

64. The system according to claim 33, further comprising:
a clock mechanism in communication with the plurality of computing devices for determining the identified time and the identified date; and
a location determining apparatus in communication with the plurality of computing devices for determining the location; and
a display apparatus in communication with the computing system and configured to display the at least one notification to the user.

* * * * *